(12) United States Patent
Sadatsuki et al.

(10) Patent No.: US 9,870,126 B2
(45) Date of Patent: Jan. 16, 2018

(54) IMAGING APPARATUS

(71) Applicant: SONY CORPORATION, Tokyo (JP)

(72) Inventors: Koichi Sadatsuki, Tokyo (JP); Takumi Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 238 days.

(21) Appl. No.: 14/640,380

(22) Filed: Mar. 6, 2015

(65) Prior Publication Data

US 2015/0261393 A1    Sep. 17, 2015

(30) Foreign Application Priority Data

Mar. 14, 2014   (JP) ................................. 2014-052107

(51) Int. Cl.
*G06F 3/0482* (2013.01)
*G06F 3/0484* (2013.01)
*H04N 5/225* (2006.01)

(52) U.S. Cl.
CPC ........ *G06F 3/0482* (2013.01); *G06F 3/04842* (2013.01); *H04N 5/2252* (2013.01)

(58) Field of Classification Search
None
See application file for complete search history.

(56) References Cited

U.S. PATENT DOCUMENTS

2013/0321691 A1    12/2013   Naito et al.

FOREIGN PATENT DOCUMENTS

JP    2005-189601 A    7/2005
JP    2006-078755 A    3/2006

*Primary Examiner* — Rochelle-Ann J Blackman
(74) *Attorney, Agent, or Firm* — Chip Law Group

(57) ABSTRACT

An imaging apparatus includes a first housing which has a light incident section in a vicinity of one end and which has an imaging optical system to which light from the light incident section is incident, a second housing which has a display section and which functions as a grip section, and a linking section which supports the first housing and the second housing so as to be able to rotate centering on a first axis, in which the first axis is provided in a vicinity of the other end which is an opposite side to the one end of the first housing, and light which includes a component which is orthogonal to the first axis is incident to the light incident section.

19 Claims, 24 Drawing Sheets

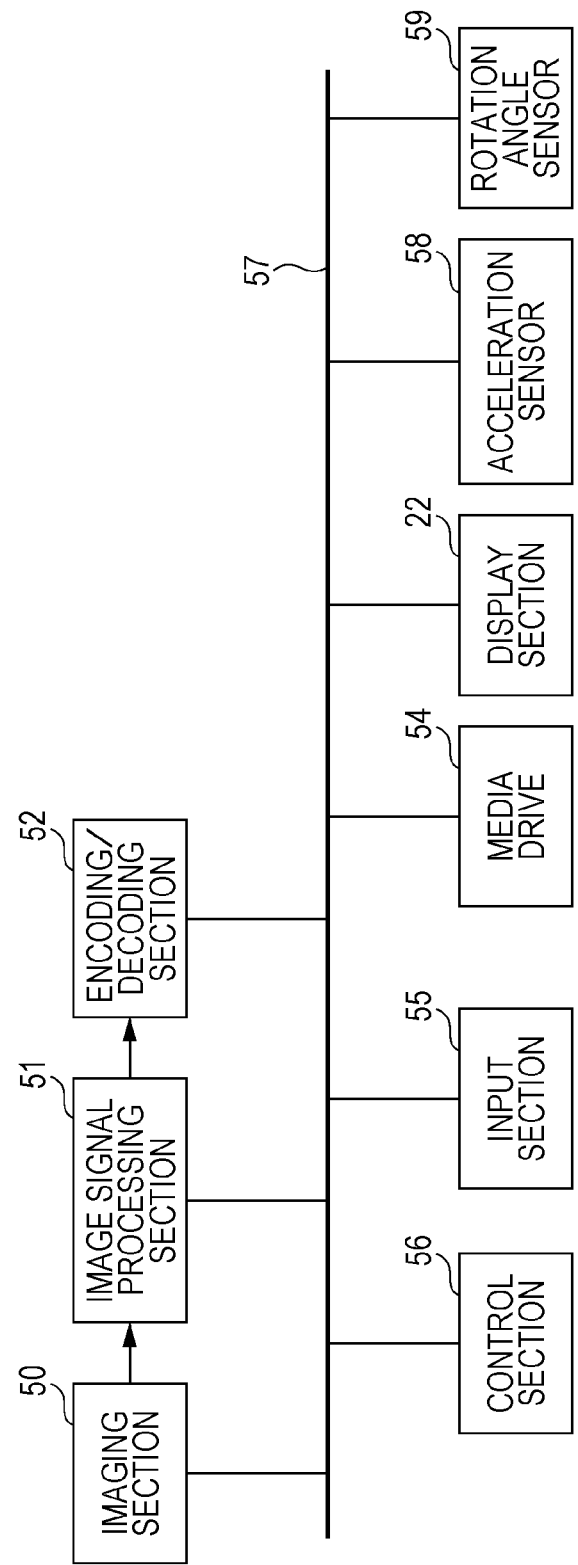

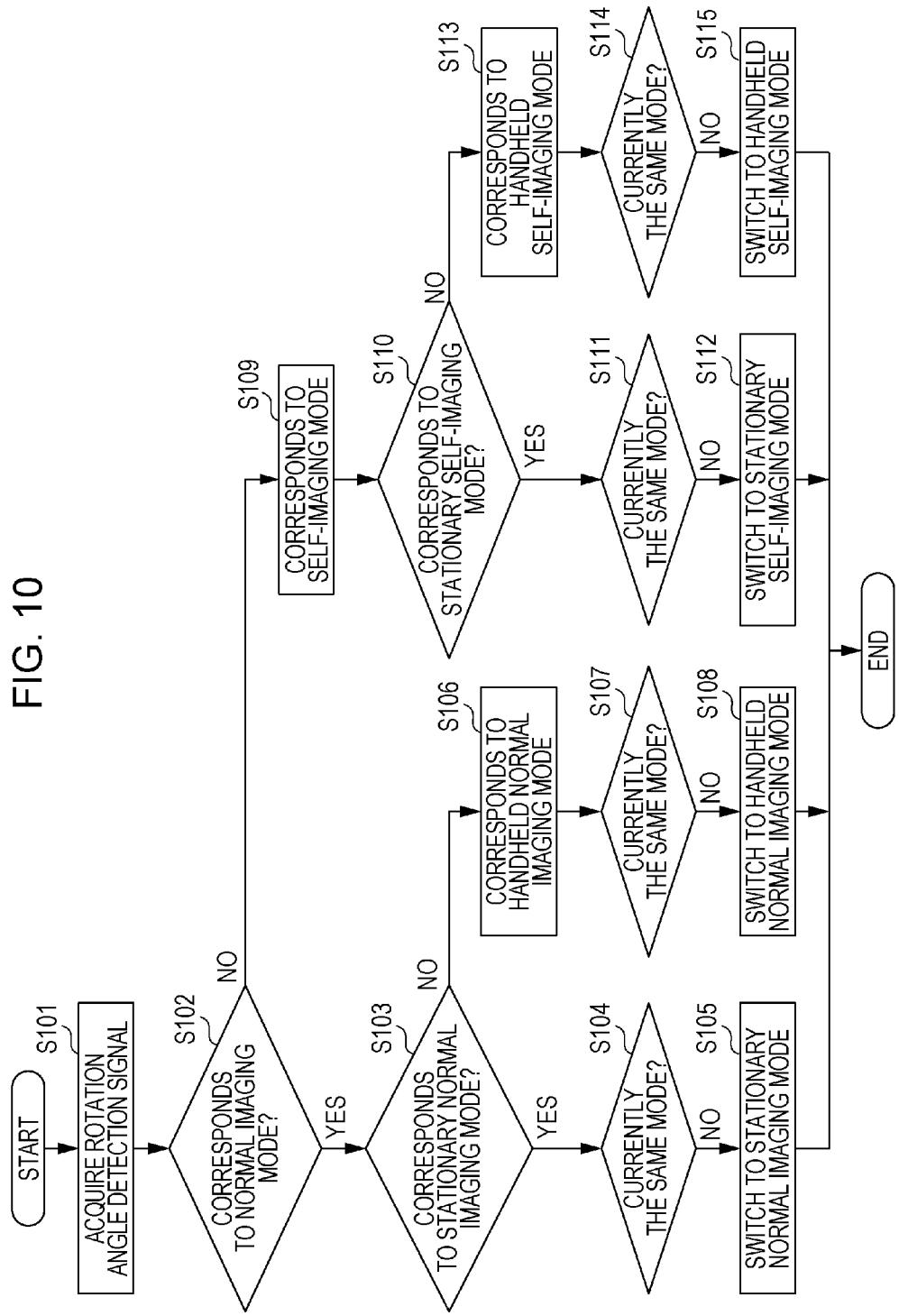

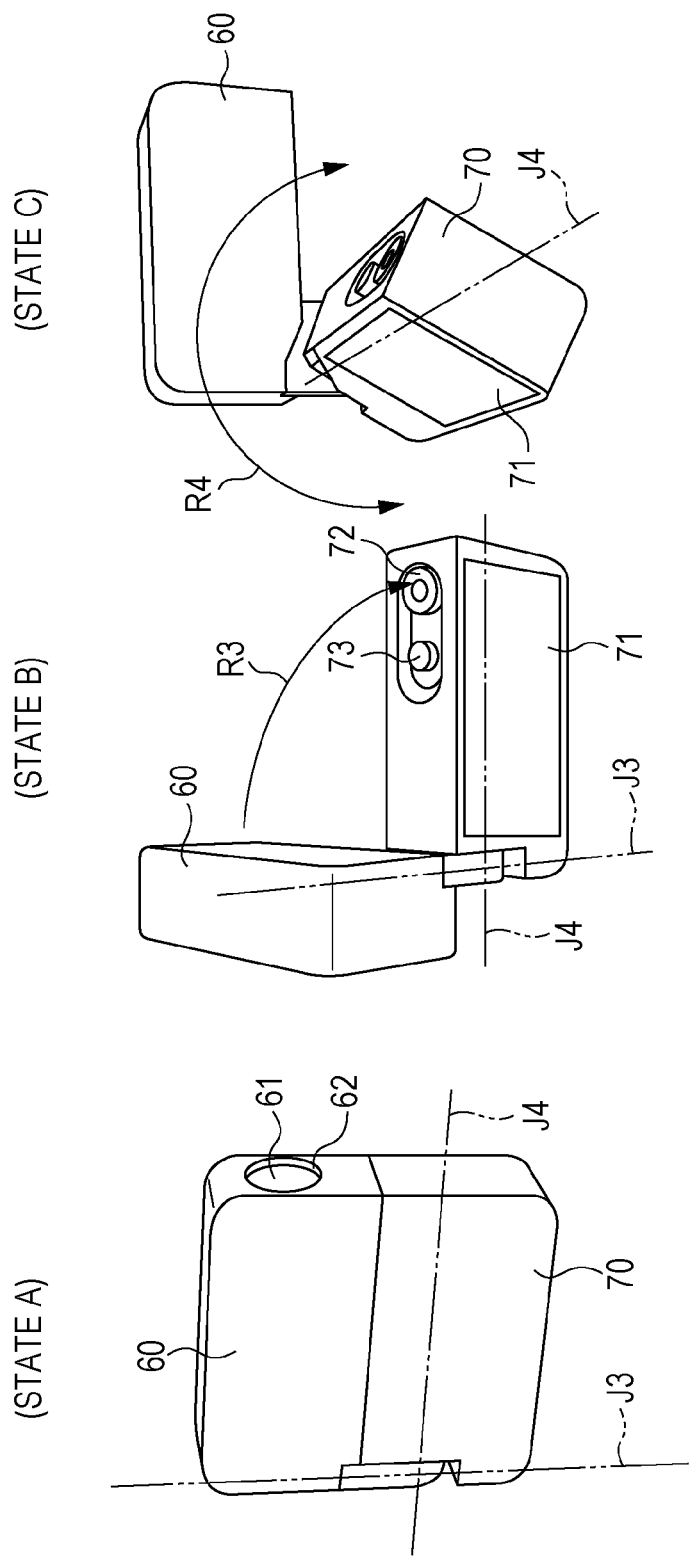

IMAGING APPARATUS

CROSS REFERENCE TO RELATED APPLICATIONS

This application claims the benefit of Japanese Priority Patent Application JP 2014-052107 filed Mar. 14, 2014, the entire contents of which are incorporated herein by reference.

BACKGROUND

The present disclosure relates to an imaging apparatus which is provided with an imaging optical system and a display section.

Imaging apparatuses such as video cameras or still cameras where a first housing which has an imaging optical system and a second housing which has a display section are linked with each other to be able to rotate are in use (for example, refer to Japanese Unexamined Patent Application Publication Nos. 2005-189601, 2006-78755, and 2013-254007 (U.S. Patent Application Publication No. 2013/0321691)).

SUMMARY

However, recently, there has been a demand for imaging apparatuses which are able to easily perform imaging in various styles according to preferences of a person doing the imaging, for example, high-angle imaging, low-angle imaging, or self-imaging (imaging the person doing the imaging themselves).

It is desirable to provide an imaging apparatus with excellent operability.

According to an embodiment of the present disclosure, there is provided an imaging apparatus including a first housing which has a light incident section in a vicinity of one end and which has an imaging optical system to which light from the light incident section is incident, a second housing which has a display section and which functions as a grip section, and a linking section which supports the first housing and the second housing so as to be able to rotate centering on a first axis. Here, the first axis is provided in a vicinity of the other end which is an opposite side to the one end of the first housing and light which includes a component which is orthogonal to the first axis is incident to the light incident section.

In the imaging apparatus as one embodiment of the present disclosure, since the second housing is supported so as to be able to rotate with respect to the first housing which has the imaging optical system centering on the first axis, it is possible to freely change an angle of the first housing in a state where the second housing is still. For this reason, for example, the person doing the imaging is able to arbitrarily and freely select the angle of a tilt direction of the first housing or the angle of a pan direction while gripping (without changing grip) the second housing and to carry out imaging in a comfortable posture. Here, since the first axis is provided in a vicinity of the other end in the first housing, it is possible to avoid filming the second housing, a hand of a user holding the housing, or the like.

According to the imaging apparatus as one embodiment of the present disclosure, the operability improves and it is possible for a person doing imaging to easily perform the imaging in various styles. Here, the effect of an embodiment of the present disclosure is not limited thereto and may be any of the effects described below.

BRIEF DESCRIPTION OF THE DRAWINGS

FIG. 9 is a block diagram which represents a circuit configuration of the imaging apparatus according to the first embodiment;

FIG. 10 is a flow chart which shows a process which is executed in the imaging apparatus according to the first embodiment;

FIG. 14 is an explanatory diagram which illustrates changes in a form of the imaging apparatus according to the second embodiment;

DETAILED DESCRIPTION OF EMBODIMENTS

Below, detailed description will be given of embodiments of the present disclosure with reference to the diagrams. Here, description will be given in the following order.
1. First Embodiment (an imaging apparatus which is provided with a first housing and a second housing which are supported on a first axis as a linking section so as to be able to rotate)
2. Second Embodiment (an imaging apparatus which is provided with a first housing and a second housing which are supported by a linking section which has a first axis and a second axis so as to be able to rotate).

First Embodiment

3. Basic Configuration of Imaging Apparatus 1

Figure 1A:
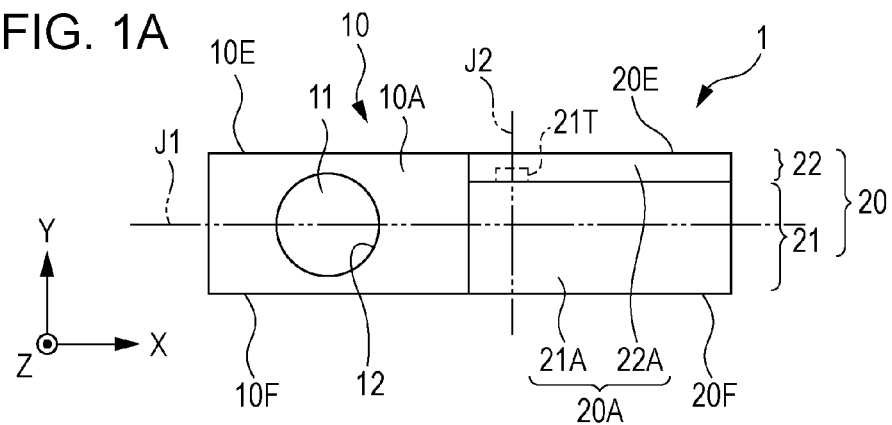
FIG. 1A is a front surface diagram which represents an external appearance of an imaging apparatus according to a first embodiment in a stored state.
Figure 1B:
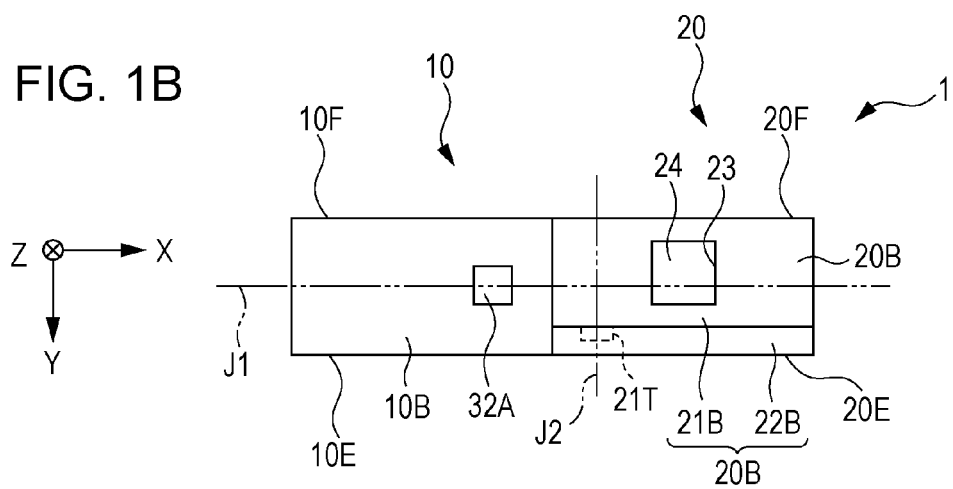
FIG. 1B is a rear surface diagram which represents the external appearance of the imaging apparatus according to the first embodiment in a stored state.
Figure 1C:
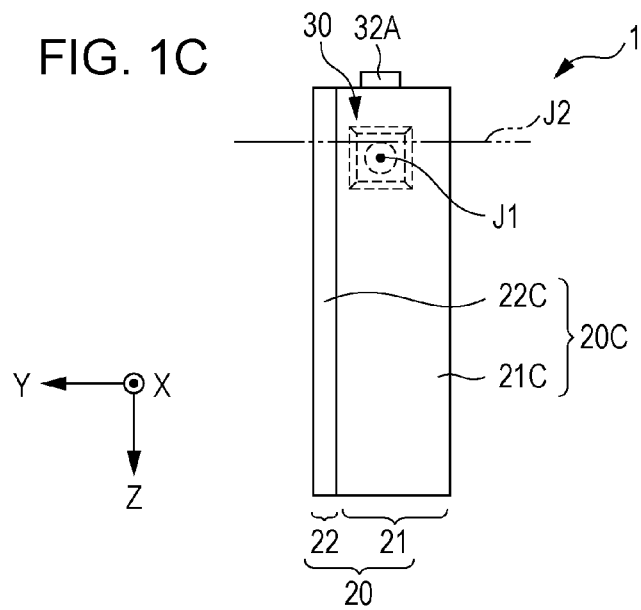
FIG. 1C is a right side surface diagram which represents the external appearance of the imaging apparatus according to the first embodiment in a stored state.
Figure 1D:
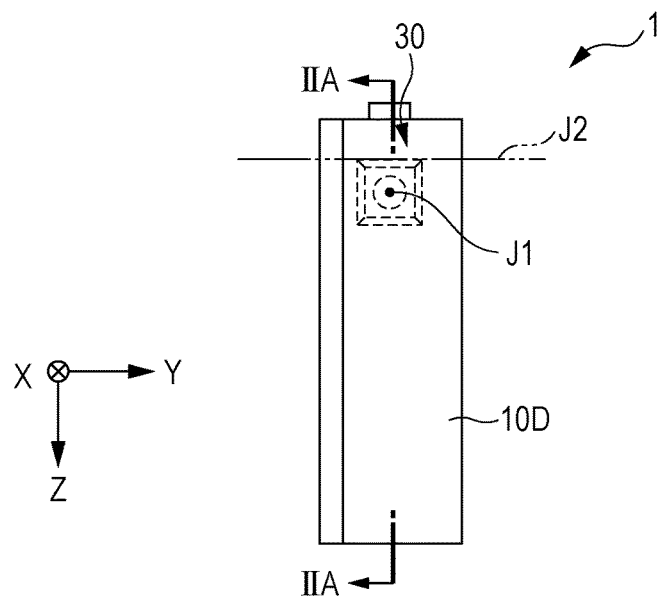
FIG. 1D is a left side surface diagram which represents the external appearance of the imaging apparatus according to the first embodiment in a stored state.
Figure 1E:
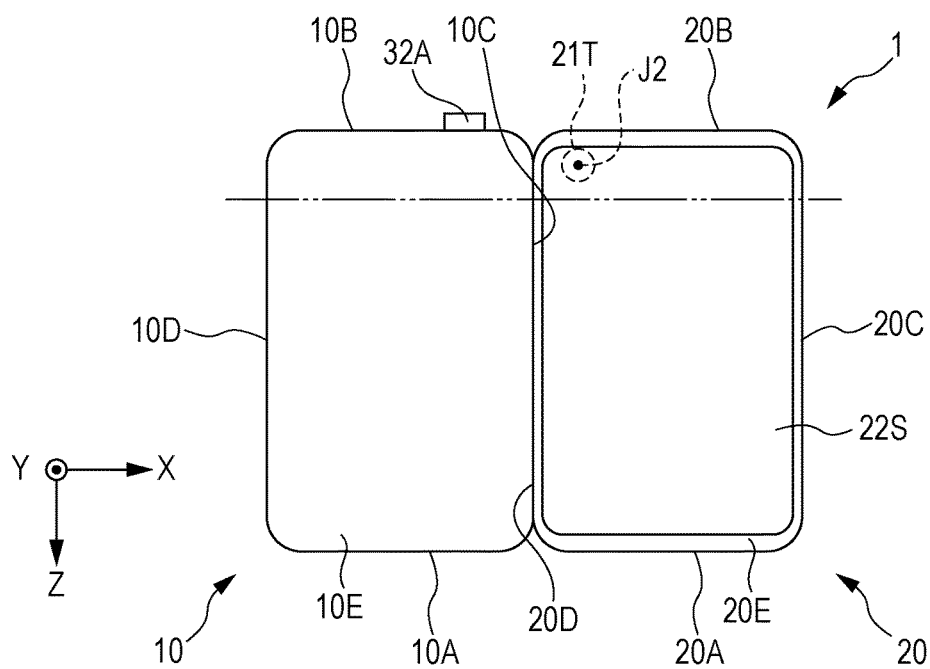
FIG. 1E is an upper surface diagram which represents the external appearance of the imaging apparatus according to the first embodiment in a stored state.
Figure 2A:
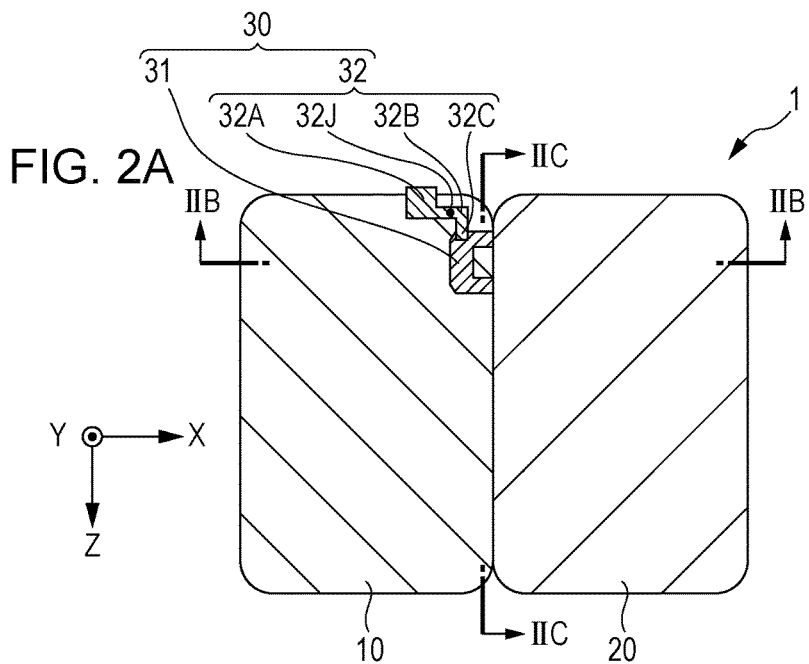
FIG. 2A is a cross-sectional diagram along the IIA-IIA line shown in FIG. 1D.
Figure 2B:
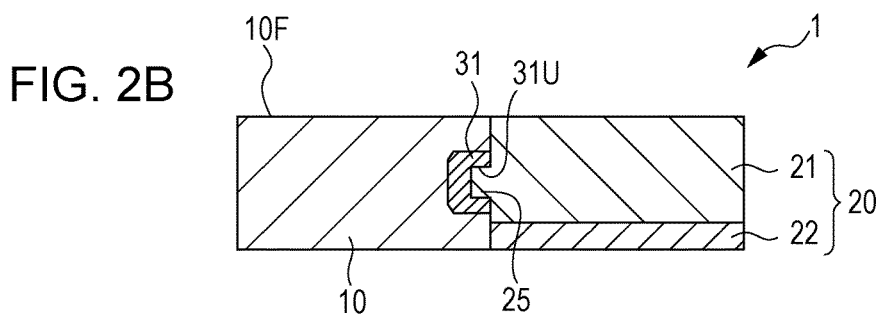
FIG. 2B is a cross-sectional diagram along the IIB-IIB line shown in FIG. 2A.
Figure 2C:
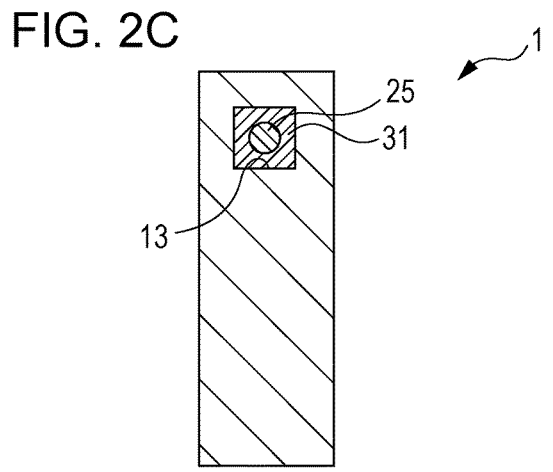
FIG. 2C is a cross-sectional diagram along the IIC-IIC line shown in FIG. 2A.
Figure 3A:
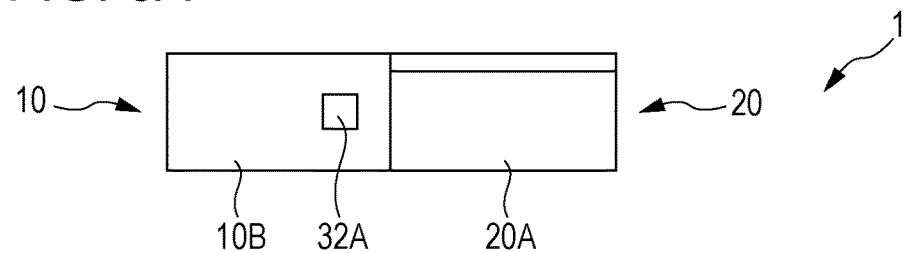
FIG. 3A is a front surface diagram which represents the external appearance of the imaging apparatus according to the first embodiment in a first use state.
Figure 3B:
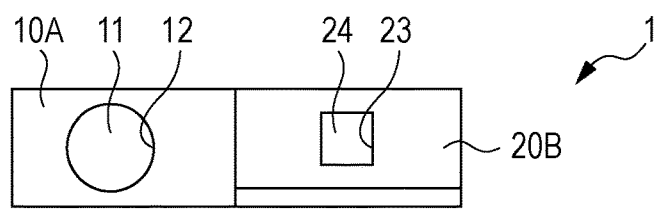
FIG. 3B is a rear surface diagram which represents the external appearance of the imaging apparatus according to the first embodiment in a first use state.
Figure 3C:
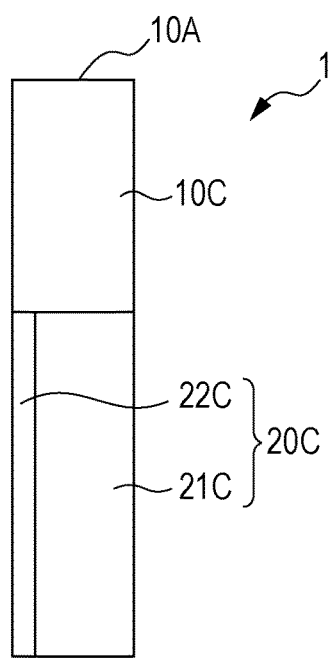
FIG. 3C is a right side surface diagram which represents the external appearance of the imaging apparatus according to the first embodiment in a first use state.
Figure 3D:
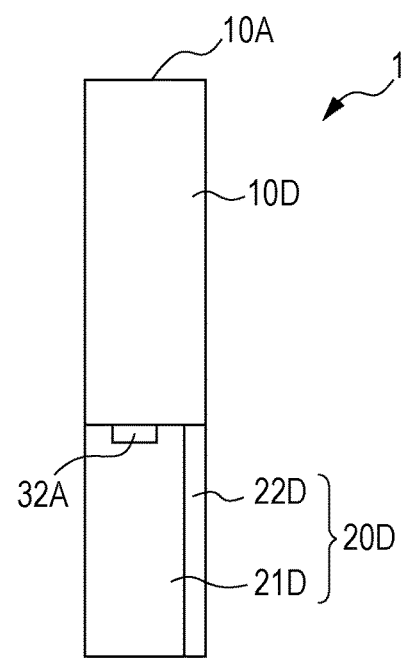
FIG. 3D is a left side surface diagram which represents the external appearance of the imaging apparatus according to the first embodiment in a first use state.
Figure 3E:
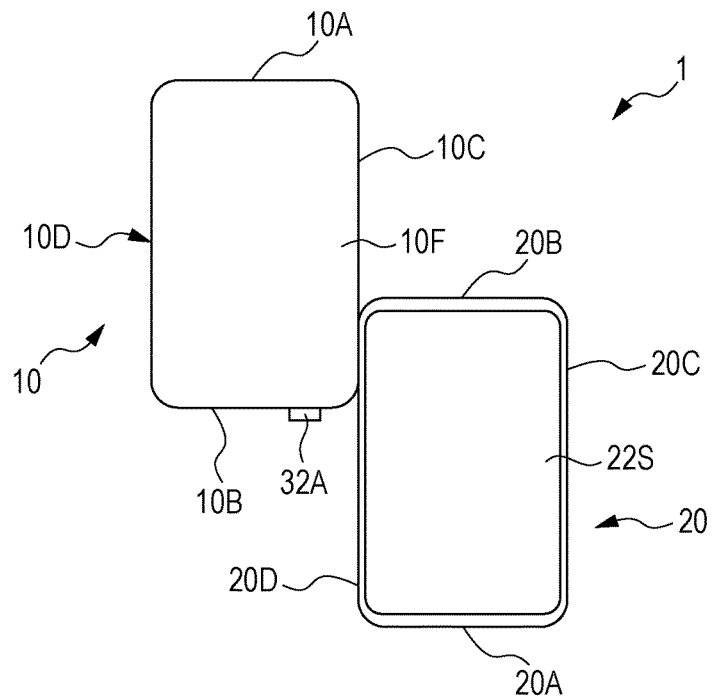
FIG. 3E is an upper surface diagram which represents the external appearance of the imaging apparatus according to the first embodiment in a first use state.
Figure 3F:
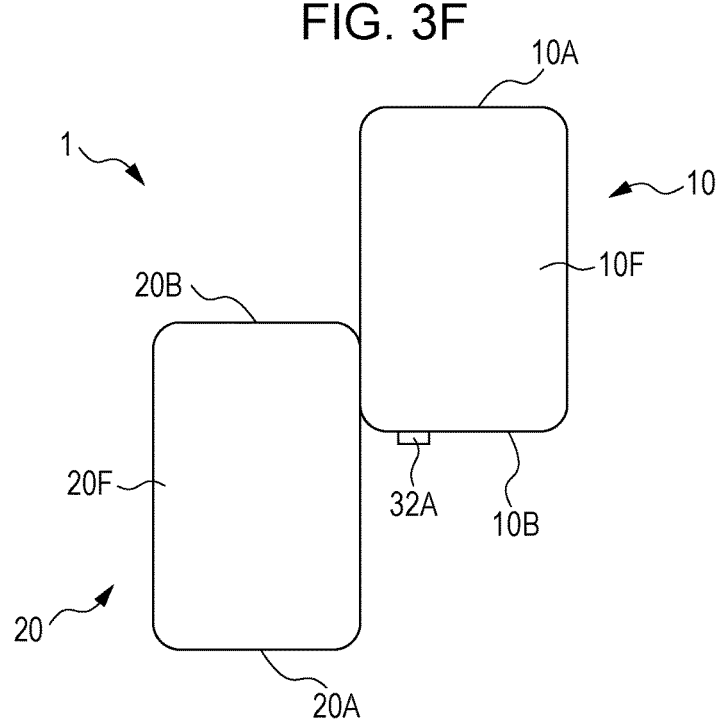
FIG. 3F is a bottom surface diagram which represents the external appearance of the imaging apparatus according to the first embodiment in a first use state.

FIGS. 1A to 1E represent the external appearance of an imaging apparatus 1 as the first embodiment of the present disclosure in a stored state and are respectively a front surface diagram, a rear surface diagram, a right side surface diagram, a left side surface diagram, and an upper surface diagram of the imaging apparatus 1. Here, since the bottom surface diagram is symmetric to the upper surface diagram, the bottom surface diagram is omitted here. In addition, FIG. 2A is a cross-sectional diagram which represents a cross-section which is parallel to a display surface 21S of a display section 21 (both will be described below) in the imaging apparatus 1 and FIG. 2B and FIG. 2C are cross-sectional diagrams which represent cross-sections which are orthogonal to the display surface 21S of the display section 21. In detail, FIG. 2A is a cross-sectional diagram in an arrow direction along the IIA-IIA line shown in FIG. 1D, FIG. 2B is a cross-sectional diagram in an arrow direction along the IIB-IIB line shown in FIG. 2A, and FIG. 2C is a cross-sectional diagram in an arrow direction along the IIC-IIC line shown in FIG. 2A. However, FIGS. 2A to 2C omit the internal structure of the imaging apparatus 1.

The imaging apparatus 1 is provided with a first housing 10, a second housing 20, and a linking section 30 which supports the first housing 10 and the second housing 20 so as to be able to rotate centering on a first axis J1.

The first housing 10 has an imaging lens 11 as an imaging optical system. External light (for example, subject light) is incident from a light incident section 12, which is provided in a vicinity of one end of the first housing 10, to the imaging lens 11. The linking section 30 is provided in a vicinity of the other end which is the opposite side to the one end where the light incident section 12 of the first housing 10 is provided. The external light which is incident to the light incident section 12 is light which includes a component which is orthogonal to the first axis J1. It is desirable that an optical axis of the imaging lens 11 be in a direction which is orthogonal to the first axis J1. Here, the imaging lens 11 may be a single lens and may be formed of a plurality of lens groups. Alternatively, the imaging lens 11 may include an optical member such as an aperture or a filter. The first housing 10 may also have an imaging element (which is not shown in the diagram) such as a charge coupled device (CCD) or a complementary metal-oxide semiconductor (CMOS) on an image side of the imaging lens 11. The imaging element photoelectrically converts the subject light which is obtained via the imaging lens 11 to an electrical signal.

The first housing 10 has, for example, a substantially rectangular parallelopiped shape. In detail, the first housing 10 has six surfaces of a front surface 10A, a rear surface 10B, a right side surface 10C, a left side surface 10D, an upper surface 10E, and a bottom surface 10F. The light incident section 12 is provided in the front surface 10A. In the first housing 10, the front surface 10A, the rear surface 10B, the upper surface 10E, and the bottom surface 10F are all parallel to the first axis J1; however, out of these surfaces, a surface which is positioned the furthest from the first axis J1 is the front surface 10A where the light incident section 12 is provided. In addition, a concave section 13, which is hollowed out in a columnar shape toward the left side surface 10D, is provided in the right side surface 10C of the first housing 10.

The second housing 20 functions, for example, as a grip section and has a main body section 21 and a display section 22. For example, a control section, a storage section, or the like is provided in the main body section 21. The display section 22 is, for example, a touch panel system display device and also functions as an operation section for performing an imaging operation or a playback operation in the imaging apparatus 1 in addition to performing an image display. The display section 22 is supported so as to be able to rotate with respect to the main body section 21, for example, centering on a second axis J2 which is orthogonal to the first axis J1. In detail, for example, a rotation axis section 21T in a columnar shape which rotates centering on the second axis J2 is erected on the upper surface of the main body section 21 and the rotation axis section 21T is fitted with a concave section (which is not shown in the diagram) which is provided in the lower surface of the display section 22 so as to be able to rotate. The main body section 21 and the display section 22 both extend within a surface which is orthogonal to the second axis J2 and are laminated in the direction of the second axis J2. The second housing 20 has a light emitting section 23 in a vicinity of another end in the main body section 21 and a projection lens 24 which emits light (image light), which includes a component which is orthogonal to the first axis J1, from the light emitting section 23. An optical axis of the projection lens 24 is, for example, a direction which is orthogonal to the first axis J1. Here, the projection lens 24 may be a single lens and may be formed of a plurality of lens groups.

Alternatively, the projection lens 24 may include an optical member such as an aperture or a filter. Here, the vicinity of another end of the second housing 20 (the main body section 21) refers to an end section which is linked to the vicinity of another end of the first housing 10 by the linking section 30. An end section which is an opposite side to the other end of the second housing 20 (the main body section 21) is referred to as one end of the second housing 20 (the main body section 21).

The second housing 20 also has a substantially rectangular parallelopiped shape in the same manner as the first housing 10. In detail, the second housing 20 has six surfaces of a front surface 20A, a rear surface 20B, a right side surface 20C, a left side surface 20D, an upper surface 20E, and a bottom surface 20F. The front surface 20A has a front surface 21A of the main body section 21 and a front surface 22A of the display section 22. In the same manner, the rear surface 20B has a rear surface 21B of the main body section 21 and a rear surface 22B of the display section 22, the right side surface 20C has a right side surface 21C of the main body section 21 and a right side surface 22C of the display section 22, and the left side surface 20D has a left side surface 21D of the main body section 21 and a left side surface 22D of the display section 22. In addition, the upper surface 20E is also an upper surface of the display section 22 and the bottom surface 20F is also a rear surface of the main body section 21.

The light emitting section 23 is provided in the rear surface 20B. The upper surface 20E includes a display surface 22S of the display section 22 where an image is displayed. In the second housing 20, the front surface 20A, the rear surface 20B, the upper surface 20E, and the bottom surface 20F are all parallel to the first axis J1; however, out of these surfaces, a surface which is positioned the furthest from the first axis J1 is the front surface 20A. A rotation axis section 25 with a columnar shape which protrudes toward the first housing 10 is provided on the left side surface 20D (to be described below) of the main body section 21. The center axis of the rotation axis section 25 matches the first axis J1.

In the present embodiment, the direction of the first axis J1 is set as an X axis direction, the direction of the second axis J2 is set as a Y axis direction, and the direction which is orthogonal to both the first axis J1 and the second axis J2 is set as a Z axis direction.

In a stored state shown in FIGS. 1A to 1E and the like, the front surface 10A and the rear surface 10B of the first housing 10 and the front surface 20A and the rear surface 20B of the second housing 20 are substantially parallel to each other. In the same manner, in a stored state, the right side surface 10C and the left side surface 10D and the right side surface 20C and the left side surface 20D are also substantially parallel to each other and the upper surface 10E and the bottom surface 10F and the upper surface 20E and the bottom surface 20F are also substantially parallel to each other.

The stored state refers to a state where the right side surface 10C of the first housing 10 and the left side surface 10D of the second housing 20 come into contact so as to fully overlap each other. In the stored state, the dimension in the X axis direction, the dimension in the Y axis direction, and the dimension in the Z axis direction in the first housing 10 are, for example, respectively substantially equal to the dimension in the X axis direction, the dimension in the Y axis direction, and the dimension in the Z axis direction in the second housing 20. Here, the dimension in the X axis direction is the width, the dimension in the Y axis direction is the thickness, and the dimension in the Z axis direction is the length. In the present embodiment, for example, the width is shorter than the length and longer than the thickness. In a stored state, in the Z axis direction, the position of one end of the first housing 10 and the position of one end of the second housing 20 substantially match and the position of the other end of the first housing 10 and the position of the other end of the second housing 20 substantially match. Accordingly, the front surface 10A and the front surface 20A configure a planar surface in common and the rear surface 10B and the rear surface 20B configure another planar surface in common.

Furthermore, the common planar surface which is configured by the front surface 10A and the front surface 20A and the common planar surface which is configured by the rear surface 10B and the rear surface 20B are substantially parallel to each other and both are substantially parallel to the first axis J1. In a stored state, in the same manner, the positions of the upper surface 10E and the upper surface 20E and the positions of the bottom surface 10F and the bottom surface 20F also substantially match in the Y axis direction. That is, in a stored state, the overall dimensions formed by the outer edges of the first housing 10 and the second housing 20 are minimized.

Next, description will be given of the linking section 30. The linking section 30 has a protruding section 31 and a locking section 32 (FIG. 2A). The first housing 10 and the second housing 20 are able to be attached and detached to and from each other in the linking section 30.

The protruding section 31 has an overall shape which is substantially prismatic and a concave section 31U with a columnar shape on one surface thereof. The concave section 31U is fitted with the rotation axis section 25 such that the inner surface thereof and the periphery surface of the rotation axis section 25 with a columnar shape come into contact. Accordingly, the protruding section 31 is supported by the rotation axis section 25 so as to be able to rotate by setting the first axis J1 as a center axis.

In a state where the first housing 10 and the second housing 20 are linked in the linking section (referred to below as a linked state), the protruding section 31 is inserted in a concave section which is provided in a part of the right side surface 10C of the first housing 10. In this case, the protruding section 31 and the first housing 10 are integral and rotate with respect to the second housing 20 by setting the first axis J1 as a center axis. Here, it is desirable that the rotating direction be both directions, but may be one direction.

In addition, it is desirable that the range of the rotatable angle be 360°, but may be an arbitrary angle of less than 360° according to the use. The locking section 32 is a mechanism which suppresses detachment of the protruding section 31, has a key shape as a whole, and has an operation section 32A, an intermediate section 32B, and a hook section 32C. In detail, the intermediate section 32B, for example, extends in the X axis direction and is supported by the first housing 10 so as to be able to rotate centering on a rotation axis 32J. The operation section 32A is provided in one end of the intermediate section 32B and the top surface thereof is exposed from the rear surface 10B to the outside. The hook section 32C is provided in the other end of the intermediate section 32B and extends in the Z axis direction. In the linked state, a front end section of the hook section 32C is locked in a groove which is provided in a part of the protruding section 31. In the locking section 32, due to such a configuration, the hook section 32C is raised in an opposite direction to the operation section 32A, that is, the −Z direction by pushing the operation section 32A in the +Z direction.

For this reason, the front end section of the hook section 32C is separated from the protruding section 31 and the protruding section 31 is able to be detached from the first housing 10. That is, the operation section 32A is a linking cancelling button and it is possible for the user to separate the first housing 10 and the second housing 20 by pushing the operation section 32A. Here, during the separation, the protruding section 31 is integral with the rotation axis section 25 of the housing 20. In addition, in the locking section 32, in a state where the user does not push the operation section 32A, the front end section of the hook section 32C is pushed onto the protruding section 31 by a biasing member (which is not shown in the diagram) such as a board spring or a coil spring.

FIGS. 3A to 3F represent a use state where the first housing 10 is rotated by 180° with respect to the second housing 20 from a stored state centering on the first axis J1 and are respectively the front surface diagram, the rear surface diagram, the right side surface diagram, the left side surface diagram, the upper surface diagram, and the bottom surface diagram of the imaging apparatus 1. This state corresponds to a case in which, for example, the user images upward (in the direction of the ceiling). At that time, for example, the user grips the second housing 20 with their right hand and operates an operating key which is displayed on the display section 22 with the thumb of their right hand. Here, the second housing 20 is in a closed state where all of the display section 22 overlaps the main body section 21.

Figure 4A:
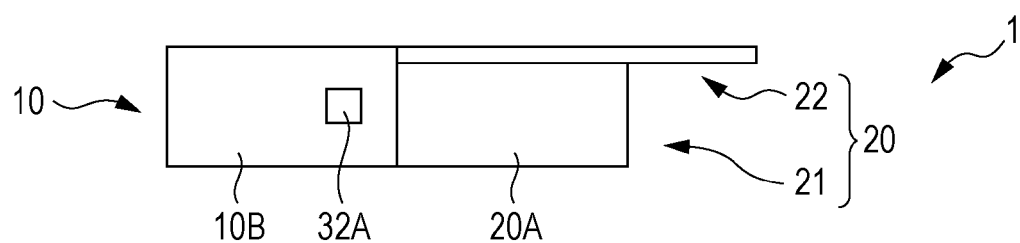
FIG. 4A is a front surface diagram which represents the external appearance of the imaging apparatus according to the first embodiment in a second use state.
Figure 4B:
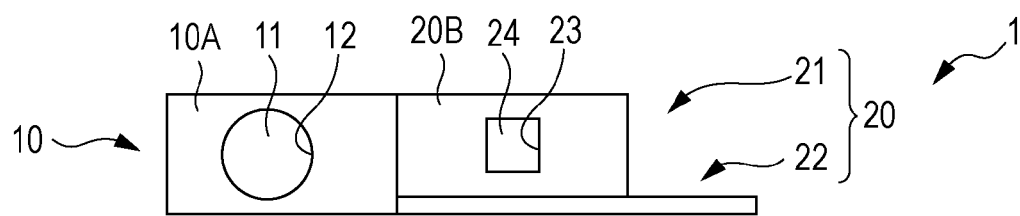
FIG. 4B is a rear surface diagram which represents the external appearance of the imaging apparatus according to the first embodiment in a second use state.
Figure 4C:
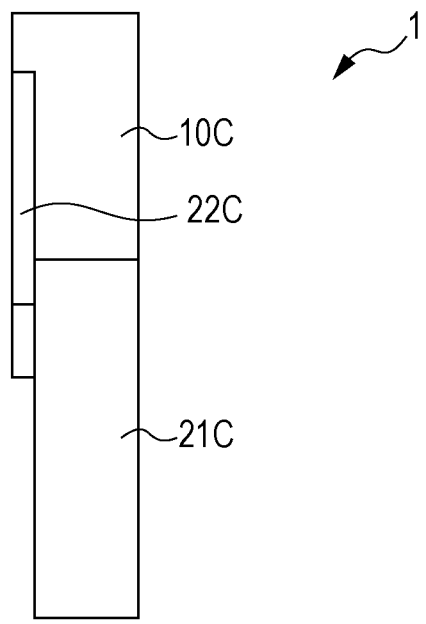
FIG. 4C is a right side surface diagram which represents the external appearance of the imaging apparatus according to the first embodiment in a second use state.
Figure 4D:
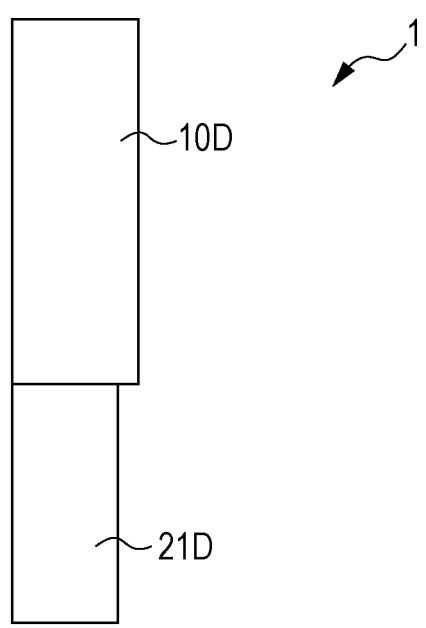
FIG. 4D is a left side surface diagram which represents the external appearance of the imaging apparatus according to the first embodiment in a second use state.
Figure 4E:
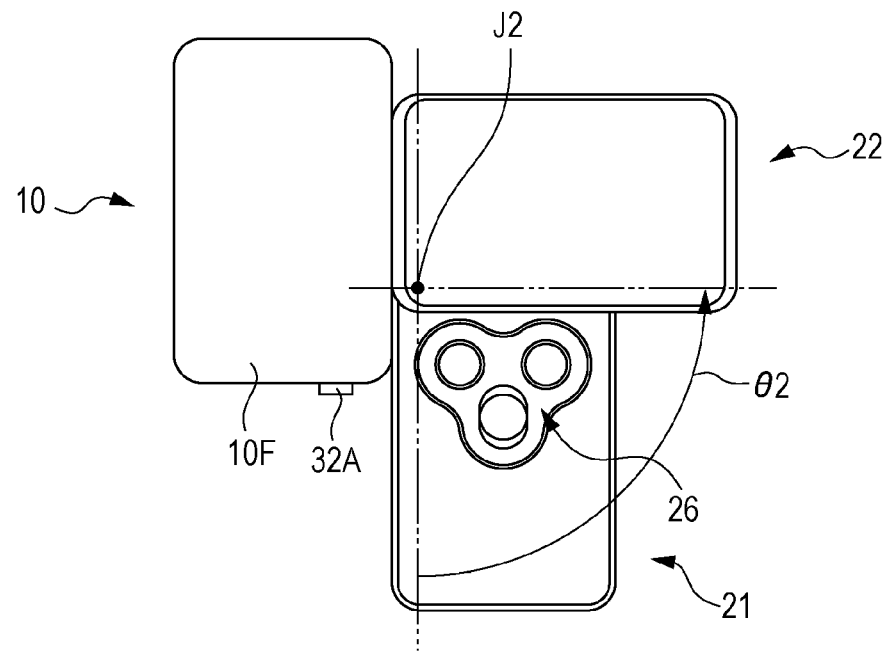
FIG. 4E is an upper surface diagram which represents the external appearance of the imaging apparatus according to the first embodiment in a second use state.
Figure 4F:
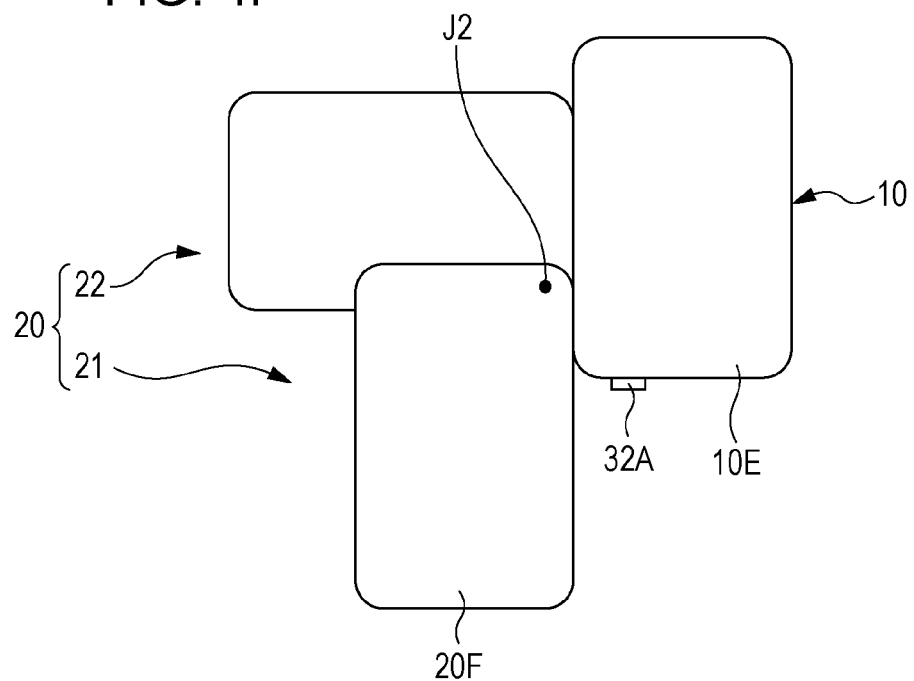
FIG. 4F is a bottom surface diagram which represents the external appearance of the imaging apparatus according to the first embodiment in a second use state.

In addition, FIGS. 4A to 4F represent an open state where the display section 22 is further rotated to the left when viewed from the upper surface from a closed state with respect to the main body section 21 centering on the second axis J2 in a use state of the imaging apparatus 1 shown in FIGS. 3A to 3F. FIGS. 4A to 4F are respectively the front surface diagram, the rear surface diagram, the right side surface diagram, the left side surface diagram, the upper surface diagram, and the bottom surface diagram of the imaging apparatus 1. The rotation angle here, that is, the angle θ2 which the display section 22 makes with respect to the main body section 21 is substantially 90° as shown in FIG. 4E. As shown in FIG. 4E, in the main body section 21 in the second housing 20, an operation section 26 is provided on an upper surface 21E which opposes the display section 22.

The operation section 26 performs an imaging operation or a playback operation in the imaging apparatus 1 instead of the operating key which is displayed on the display section 22 and is, for example, a mechanical button. Here, it is possible for the number, the size, the arrangement, or the like of the buttons in the operation section 26 to be appropriately changed without being limited to the example shown in FIG. 4E.

In this manner, in the imaging apparatus 1, according to the amount of rotation (or a rotated angle θ2) in which the display section 22 is rotated with respect to the main body section 21 centering on the second axis J2, it is possible to change the size of a region in which the display section 22 and the main body section 21 overlap when viewed in the direction of the second axis J2.

The imaging apparatus 1 is provided with a control section 56 (to be described below) and switching of the screen display in the display section 22 is performed by the control section 56 according to changes in the region in which the display section 22 and the main body section 21 overlap which accompany the rotation centering on the second axis J2. In a state where the region in which the display section 22 and the main body section 21 overlap is comparatively large, for example, in a closed state, an operating menu image and an imaging image (a through image or a playback image) are divided and displayed on the display surface 22S of the display section 22. On the other hand, in an open state where the region in which the display section 22 and the main body section 21 overlap is comparatively small, an imaging image with larger dimensions than the imaging image in the closed state is displayed on the display surface 22S of the display section 22 (for example, displayed over the entire screen).

2. Operation Mode of Imaging Apparatus 1

A plurality of operation modes are prepared in the imaging apparatus 1. The operation modes are generally classified into an imaging mode for performing imaging and a playback mode for playing back an image.

Imaging Mode

The imaging modes are divided into a normal imaging mode and a self-imaging mode. Furthermore, there is a handheld normal imaging mode and a stationary normal imaging mode in the normal imaging modes and there is a handheld self-imaging mode and a stationary self-imaging mode in the self-imaging mode. In the imaging apparatus 1, imaging both a moving image and a still image may be possible in each of the imaging modes and imaging only one may be possible.

FIGS. 5A to 5F represent a form of the imaging apparatus 1 which corresponds to the handheld normal imaging mode and are respectively the perspective diagram, the front surface diagram, the rear surface diagram, the right side surface diagram, the left side surface diagram, and the upper surface diagram of the imaging apparatus 1. The handheld normal imaging mode is an imaging mode which carries out imaging in a state where the user (the person doing the imaging) points the light incident section 12 (the imaging lens 11) toward a subject in front while gripping the main body section 21 with their right hand pointing the display surface of the display section 22, that is, the upper surface 20E, toward the front (the user side).

The user is able to rotate the first housing 10 with their left hand and point the light incident section 12 (the imaging lens 11) toward an arbitrary subject. In addition, the user is able to easily perform imaging at an arbitrary imaging angle from a high-angle to a low-angle by operating the operation section 26 without changing grip with their right hand which grips the main body section 21. Here, FIGS. 5A to 5F represent a state where the display section 22 is open with respect to the main body section 21, that is, a state of being rotated by 90° from a closed state centering on the second axis J2 (which is not shown in FIGS. 5A to 5F); however, use in a closed state is also possible. In FIGS. 5A to 5F, the upper surface 10E and the bottom surface 10F of the first housing 10 are parallel to the horizontal surface and a state where the upper surface 20E and the bottom surface 20F of the second housing 20 are inclined by substantially 45° with respect to the horizontal surface is represented. The handheld normal imaging mode is a state where the light incident section 12 faces the opposite side to the direction in which the display surface (the upper surface 20E) of the display section 22 faces.

Figure 5A:
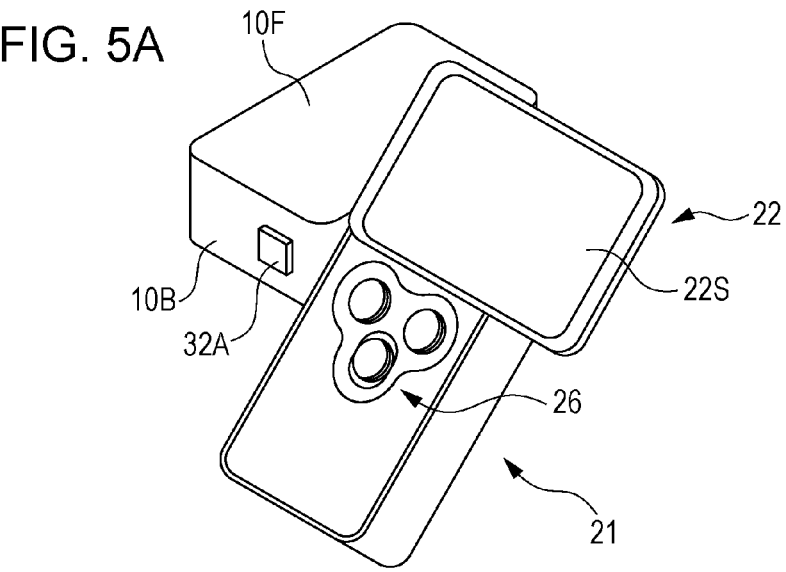
FIG. 5A is a perspective diagram which represents a form of the imaging apparatus according to the first embodiment which corresponds to a normal imaging mode.
Figure 5B:
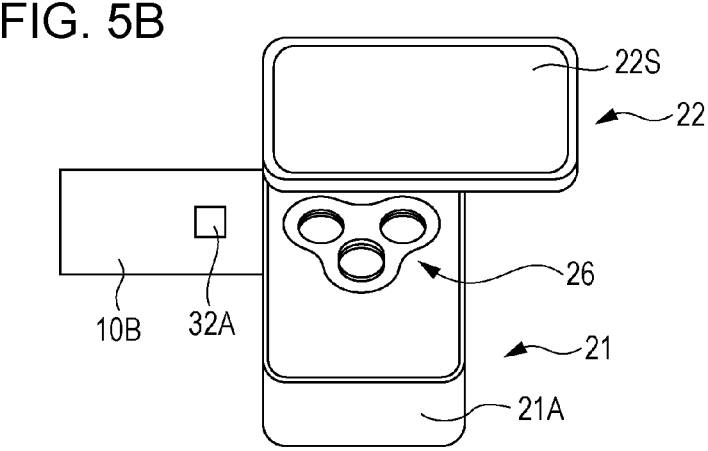
FIG. 5B is a front surface diagram which represents a form of the imaging apparatus according to the first embodiment which corresponds to a normal imaging mode.
Figure 5C:
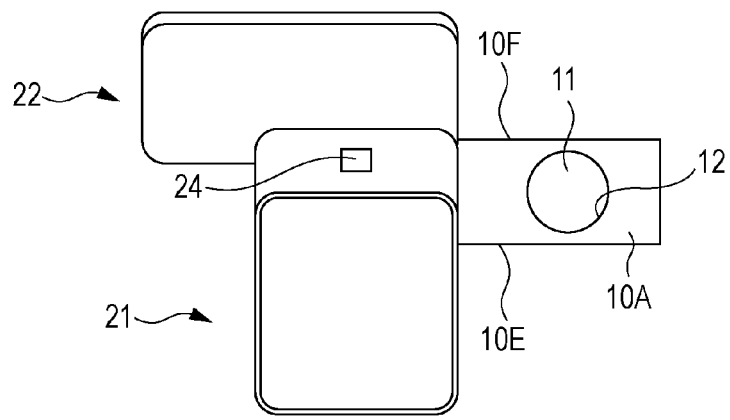
FIG. 5C is a rear surface diagram which represents a form of the imaging apparatus according to the first embodiment which corresponds to a normal imaging mode.
Figure 5D:
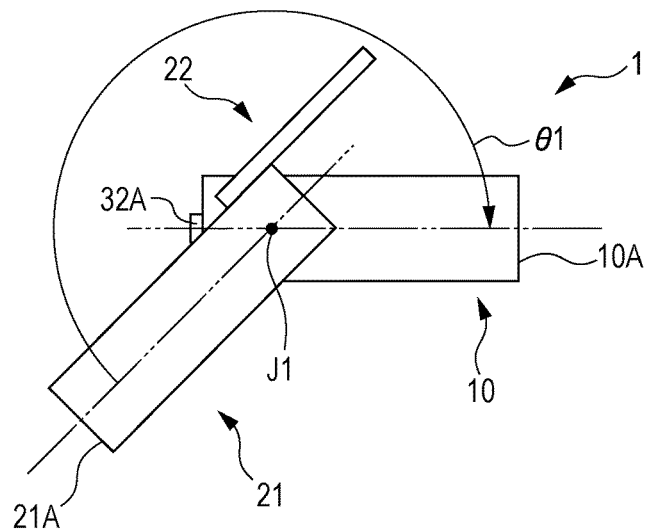
FIG. 5D is a right side surface diagram which represents a form of the imaging apparatus according to the first embodiment which corresponds to a normal imaging mode.
Figure 5E:
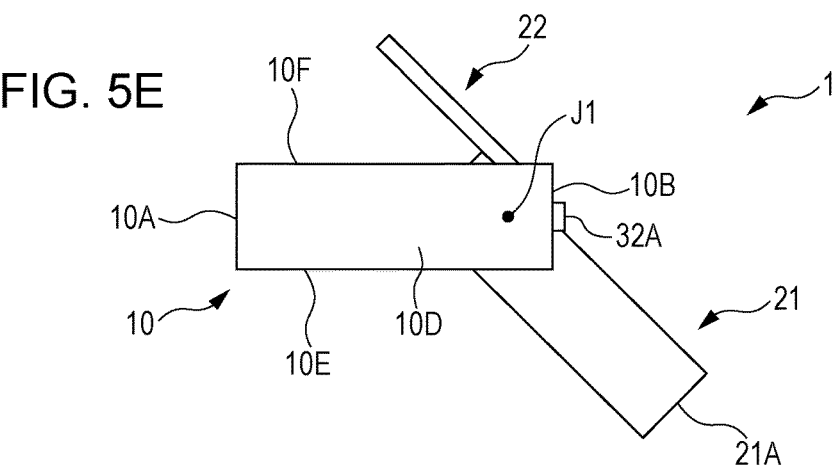
FIG. 5E is a left side surface diagram which represents a form of the imaging apparatus according to the first embodiment which corresponds to a normal imaging mode.
Figure 5F:
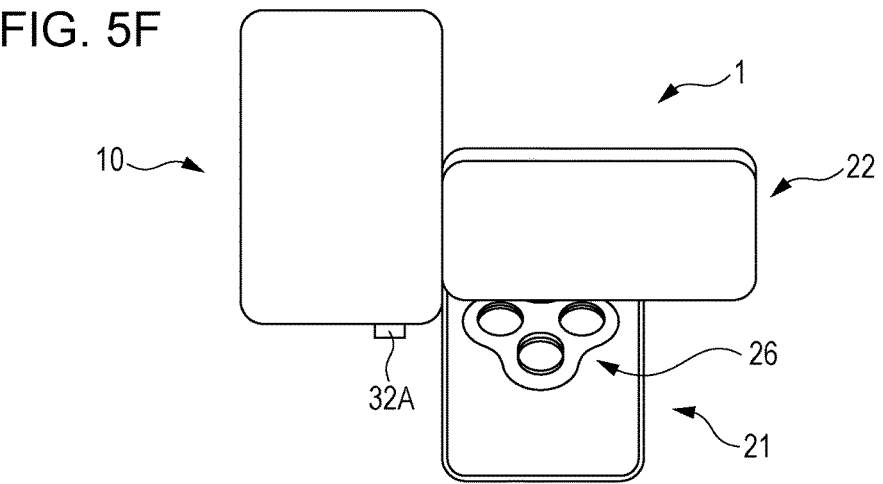
FIG. 5F is an upper surface diagram which represents a form of the imaging apparatus according to the first embodiment which corresponds to a normal imaging mode.

In detail, as shown in FIG. 5D, the definition is a state where an angle θ1 formed by the first housing 10 and the second housing 20 is 180° or more to less than 360°. Here, in a case of viewing the first housing 10 from the second housing 20 as shown in FIG. 5D, the angle θ1 refers to an angle, which is 0° when the first housing 10 is in a stored state, at which the first housing 10 is rotated to the right from this position centering on the first axis J1.

Figure 6A:
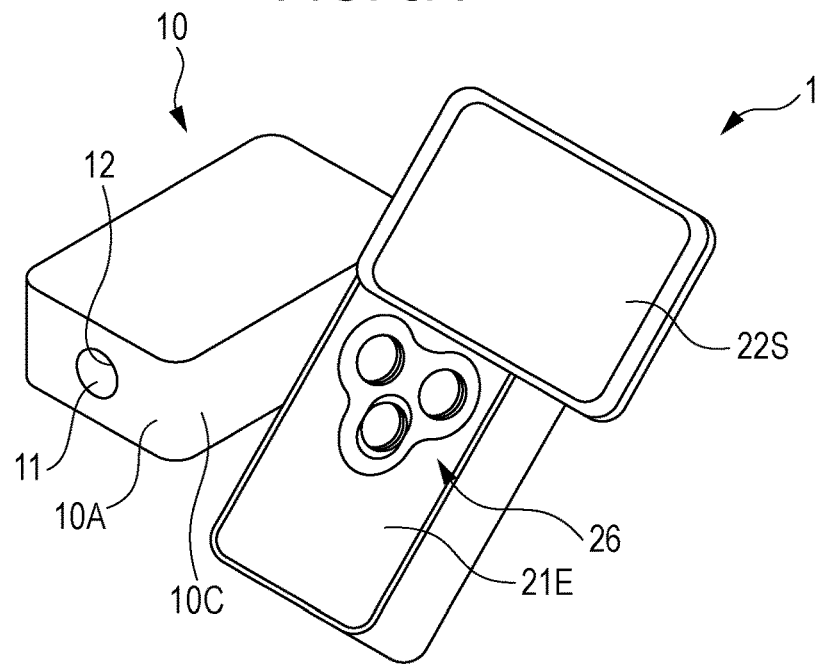
FIG. 6A is a perspective diagram which represents a form of the imaging apparatus according to the first embodiment which corresponds to a self-imaging mode.
Figure 6B:
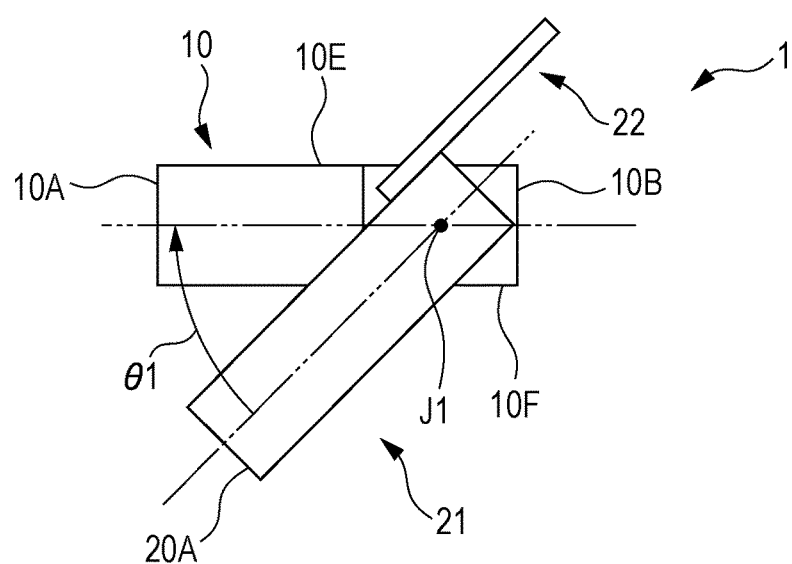
FIG. 6B is a right side surface diagram which represents a form of the imaging apparatus according to the first embodiment which corresponds to a self-imaging mode.

FIG. 6A is a perspective diagram which represents a form of the imaging apparatus 1 which corresponds to the handheld self-imaging mode. In addition, FIG. 6B is a right side surface diagram which represents a form of the imaging apparatus 1 which corresponds to the handheld self-imaging mode. The handheld self-imaging mode is an imaging mode which images in a state where the user also points the light incident section 12 (the imaging lens 11) toward the user themself to be a subject while gripping the main body section 21 with their right hand pointing the display surface of the display section 22 toward the front (the user side). The handheld self-imaging mode is a state where the light incident section 12 faces the same side as the direction in which the display surface (the upper surface 20E) of the display section 22 faces. In detail, the definition is a state where an angle θ1 formed by the first housing 10 and the second housing 20 is more than 0° to less than 180° (refer to FIG. 6B).

Figure 7A:
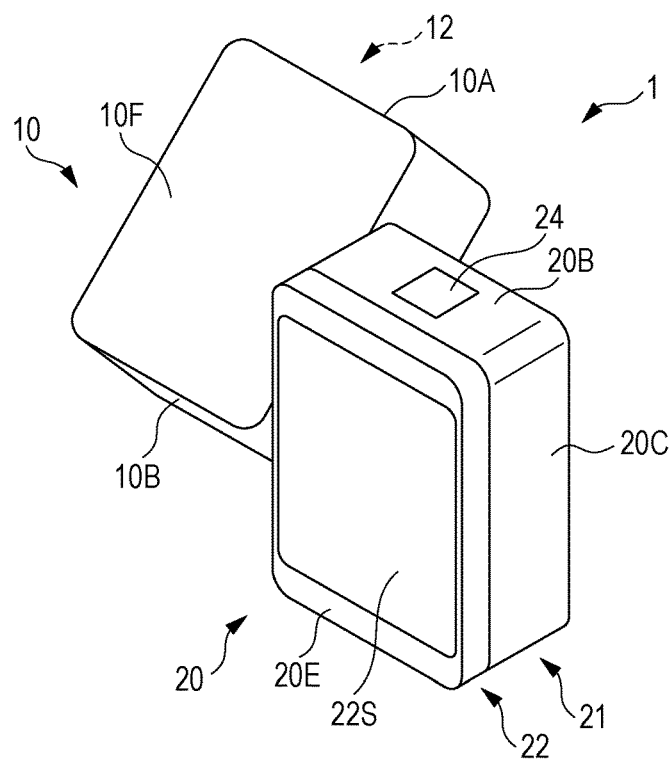
FIG. 7A is a perspective diagram which represents a form of the imaging apparatus according to the first embodiment which corresponds to a stationary normal imaging mode.

FIG. 7A is a perspective diagram which represents a form of the imaging apparatus 1 which corresponds to the stationary normal imaging mode. The stationary normal imaging mode is an imaging mode which images in a state where the front surface 20A faces downward, the second housing 20 is erected on a table or the like, and the first housing 10 faces toward a subject in front (a state where the angle θ1 is in a range of 180° or more to less than 360°). The point of being in a state where the angle θ1 formed by the first housing 10 and the second housing 20 is in a range of 180° or more to less than 360° is in common with the normal imaging mode with the handheld imaging. In the stationary normal imaging mode, since the upper surface 20E of the second housing 20, that is, the display surface 22S of the display section 22, faces the front (the front surface), the user is able to perform imaging while confirming the imaging image.

Figure 7B:
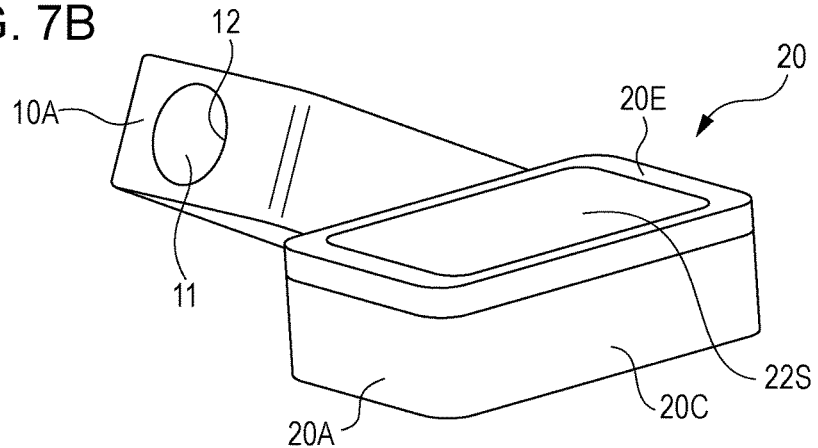
FIG. 7B is a perspective diagram which represents a form of the imaging apparatus according to the first embodiment which corresponds to a stationary self-imaging mode.

FIG. 7B is a perspective diagram which represents a form of the imaging apparatus 1 which corresponds to the stationary self-imaging mode. The stationary self-imaging mode is an imaging mode which images in a state where the imaging apparatus 1 is stationary on a table or the like, the first housing 10 is slightly rotated from a stored state centering on the first axis J1, and the upper surface 10E is pointed upward toward a subject in front. The point of being in a state where the angle θ1 formed by the first housing 10 and the second housing 20 is in a range of 0° or more to less than 180° is in common with the self-imaging mode with the handheld imaging. In the stationary self-imaging mode, since the upper surface 20E of the second housing 20, that is, the display surface of the display section 22, faces upward, the user is able to perform imaging while confirming the imaging image.

Playback Mode

Figure 8:
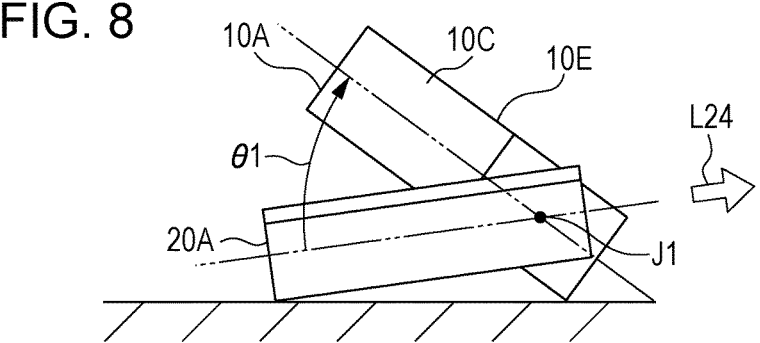
FIG. 8 is a right side surface diagram which represents a form of the imaging apparatus according to the first embodiment which corresponds to a projection playback mode.

The playback modes include a projection playback mode and a screen playback mode. FIG. 8 is a perspective diagram which represents a form of the imaging apparatus 1 which corresponds to the projection playback mode. In this case, for example, the mode switches to the projection playback mode due to an operation of the operating key which is displayed on the display surface 22S, or due to the operation of a mechanical key (such as a mechanical button) which is provided in the second housing 20. Due to this, image light from the projection lens 24 is emitted from the light emitting section 23 to the outside and a playback image is projected on a screen or the like. At that time, the same playback image may also be displayed on the display surface 22S at the same time. In addition, by switching to the screen playback mode by an operation of an operating key or a mechanical key, the playback image may only be displayed on the display surface 22S without performing projection to a screen or the like.

3. Inner Configuration of Imaging Apparatus 1

FIG. 9 is a block diagram which shows a circuit configuration in the inner section of the imaging apparatus 1. An imaging section 50, an image signal processing section 51, an encoding/decoding section 52, a media drive 54, an input section 55, the control section 56, a bus 57, an acceleration sensor 58, and a rotation angle sensor 59 are provided in the inner section of the imaging apparatus 1. Excluding the bus 57, each of the sections and the display section 22 are connected with each other by the bus 57 and various types of data, control signals, or the like are sent and received. Here, although not described in FIG. 9, a sending and receiving section which sends and receives various types of data, a control signal, or the like to and from the outside may be provided and connected with each of the constituent components described above by the bus 57.

The imaging section 50 is a mechanism which acquires imaging image data. Apart from the imaging lens 11 and an imaging element, the imaging section 50 has a sample holding/automatic gain control (AGC) circuit, a video A/D convertor, or the like which performs a gain adjustment or waveform shaping with regard to an electrical signal which is obtained by an imaging element. Furthermore, the imaging section 50 has a function which performs focusing, zooming, shutter speed adjustment, aperture adjustment, and the like based on control by the control section 56.

The image signal processing section 51 carries out various types of image signal processing, for example, gradation correction processing, shading correction process, high area correction (outline correction) processing, camera shake correction processing, or the like with respect to imaging image data obtained by the imaging section 50.

The encoding/decoding section 52 performs a compression process regarding the imaging image data where image signal processing is carried out by the image signal processing section 51, and performs an extension process on the compressed imaging image data. Regarding still images, for example, a compression process and an extension process are performed according to a predetermined still image type such as a Joint Photographic Experts Group (JPEG) type. On the other hand, regarding moving images, for example, a compression process and an extension process are performed according to a predetermined moving image type such as a Moving Picture Experts Group (MPEG) type.

The display section 22 displays various types of information, for example, various types of operating menu screens, through images, or playback images based on control by the control section 56.

The media drive 54 is a recording and playback mechanism with respect to a semiconductor memory such as a flash memory or various types of recording media such as magnetic disks, optical discs, and an optical magnetic discs. The media drive 54 records compressed imaging image data of a still image type or a moving image type which is obtained in the encoding/decoding section 52 on a recording medium and plays back (reads out) various types of data of the compressed imaging image data which is recorded on the recording medium based on control by the control section 56.

The input section 55 is a portion where the user inputs various types of operations with respect to the imaging apparatus 1 and is, for example, a touch panel which is included in the display section 22 or the operation section 26 which is provided in the main body section 21. The input section 55 detects an input operation from the user and transmits information (operation input information) according to the input operation to the control section 56.

The acceleration sensor 58 detects gravitational acceleration and sends an acceleration detection signal to the control section 56 and is, for example, a three-axis sensor. Out of the acceleration detection signals according to the acceleration sensor 58, for example, the direction in which gravity acts is detected based on a DC component and vibration is detected based on an AC component.

The rotation angle sensor 59 is configured by a rotary encoder and the like and includes a sensor which detects an angle θ1 (refer to FIG. 5D and FIG. 6B) in rotation centering on the first axis J1 and a sensor which detects an angle θ2 (refer to FIG. 4E) in rotation centering on the second axis J2. The rotation angle sensor 59 detects rotation of the first housing 10 or rotation of the display section 22 and sends a rotation angle detection signal to the control section 56.

The control section 56 is a microcomputer which is provided with, for example, a central processing unit (CPU), a read only memory (ROM), a random access memory (RAM), or the like. The control section 56 executes a process according to a program which is stored, for example, in a ROM and the like and performs overall control of the imaging apparatus 1. The control section 56 sends a command to execute a compression process with regard to imaging image data from the image signal processing section 51 with respect to the encoding/decoding section 52 based on the operating input according to a shutter operation (a release operation) via the input section 55, for example, when imaging a still image.

Furthermore, the control section 56 commands the media drive 54 to record the compressed imaging image data, which is obtained due to this, on a recording medium. In addition, the control section 56 sends a command to execute a compression process with regard to imaging image data from the image signal processing section 51 with respect to the encoding/decoding section 52 based on the operating input according to a recording starting operation via the input section 55 when imaging a moving image. Furthermore, the control section 56 commands the media drive 54 to record the compressed imaging image data, which is obtained due to this, onto a recording medium. The control section 56 carries out control so as to display an image as a through image on the display section 22 based on the imaging image data which is obtained in the image signal processing section 51 while in the imaging mode.

The control section 56 carries out control so as to switch screen displays in the display section 22 according to changes in the region in which the display section 22 and the main body section 21 overlap which accompany the rotation centering on the second axis J2. For example, while an operating menu image and an imaging image (a through image or a playback image) are divided and displayed on the display surface 22S in a closed state, an imaging image with larger dimensions than the imaging image in the closed state is displayed on the display surface 22S (for example, displayed over the entire screen) in an open state.

4. Process According to Operation Mode of Imaging Apparatus 1

In the imaging apparatus 1 of the present embodiment, the control section 56 further performs processing such as the following according to the operation mode.

In the imaging apparatus 1, for example, when the first housing 10 is rotated by a predetermined angle or more from a stored state centering on the first axis J1, that is, when the angle θ1 is a predetermined size, power is automatically input to the imaging apparatus 1 and the imaging mode is set. When the first housing 10 returns to the stored state again after being rotated from the stored state, the power source is automatically turned off in cases where no operation is performed over a predetermined period. Alternatively, the turning on and off of the power source may be carried out by operating a mechanical key which is not shown in the diagram. In addition, it is also possible to switch from the imaging mode to the playback mode, for example, by an operating key which is displayed on the display section 22. Also, in a case in which no operation is performed over a predetermined period in the playback mode, the power source may be automatically turned off.

FIG. 10 is a flow chart for a process which the imaging apparatus 1 executes in an imaging mode. The process shown in FIG. 10 is executed by the control section 56, for example, according to a program which is stored in a ROM or the like. Here, the control section 56 repeatedly executes the flow chart shown in FIG. 10 for every predetermined period.

The control section 56 firstly acquires a rotation angle detection signal from the rotation angle sensor 59 (step S101). After that, the control section 56 determines whether the state of the current imaging apparatus 1 is a handheld normal imaging mode, a stationary normal imaging mode, a handheld self-imaging mode, a stationary self-imaging mode, a projection playback mode, or a screen playback mode based on the rotation angle detection signal.

In detail, a process of determining whether or not the mode is a normal imaging mode is performed according to whether or not the angle θ1 is 180° or more to less than 360° (step S102). In a case of determining the mode to be a normal imaging mode, a determination of whether or not the mode is a stationary normal imaging mode is further performed (step S103). Here, the determination process of whether or not the mode is a stationary normal imaging mode is, for example, performed according to the presence or absence of vibration based on an acceleration detection signal from the acceleration sensor 58. That is, the mode is determined to be a handheld normal imaging mode when the AC component in the acceleration detection signal is, for example, a predetermined value or more, and the mode is determined to be a stationary normal imaging mode when the AC component is less than a predetermined value.

As another example, by providing a light emitting section and a light receiving section in positions which face downward when stationary, the determination may be carried out by the light emitting section and the light receiving section. In addition, the determination may be carried out by detecting whether or not the second housing 20 is gripped using an optical method which uses the light emitting section or the light receiving section or using a mechanical method which uses a touch sensor or the like.

In a case of determining the mode to be the stationary normal imaging mode in step S103, the control section 56 determines whether or not the mode is currently the same mode (the stationary normal imaging mode) (step S104). In step S104, in a case of determining the mode to currently be a stationary normal imaging mode, the process shown in FIG. 10 ends. On the other hand, in a case of determining the mode not to currently be a stationary normal imaging mode, a process which switches to setting a stationary normal imaging mode is executed (step S105), and the process ends.

In addition, in a case of determining the mode not to be a stationary normal imaging mode in step S103, the control section 56 recognizes the mode to be a handheld normal imaging mode (step S106). In this case, a determination of whether or not the mode is currently the same mode (a handheld normal imaging mode) is further performed (step S107). In step S107, in a case of determining the mode to currently be a handheld normal imaging mode, the process shown in FIG. 10 ends. On the other hand, in a case of determining the mode not to currently be a handheld normal imaging mode, a process which switches to setting a handheld normal imaging mode is executed (step S108), and the process ends.

In addition, in step S102, in a case of determining the mode not to be a normal imaging mode, the control section 56 recognizes the mode to be a self-imaging mode (step S109). In this case, a determination of whether or not the mode is a stationary self-imaging mode is further performed (step S110). Here, the determination process is, for example, performed according to the presence or absence of vibration based on an acceleration detection signal from the acceleration sensor 58. That is, the mode is determined to be a handheld self-imaging mode when the AC component in the acceleration detection signal is, for example, a predetermined value or more, and the mode is determined to be a stationary self-imaging mode when the AC component is less than a predetermined value.

As another example, by providing a light emitting section and a light receiving section in positions which face downward when stationary, the determination may be carried out by the light emitting section and the light receiving section. In addition, the determination may be carried out by detecting whether or not the second housing 20 is gripped using an optical method which uses the light emitting section or the light receiving section or using a mechanical method which uses a touch sensor or the like.

In a case of determining the mode to be a stationary self-imaging mode in step S110, the control section 56 performs a determination of whether or not the mode is currently the same mode (the stationary self-imaging mode) (step S111). In step S111, in a case of determining the mode to currently be a stationary self-imaging mode, the process shown in FIG. 10 ends. On the other hand, in a case of determining the mode not to currently be a stationary self-imaging mode, a process which switches to setting a stationary self-imaging mode is executed (step S112), and the process ends.

In addition, in a case of determining the mode to not be a stationary self-imaging mode in step S110, the control section 56 recognizes the mode to be a handheld self-imaging mode (step S113). In this case, a determination of whether or not the mode is currently the same mode (the handheld self-imaging mode) is further performed (step S114). In step S114, in a case of determining the mode to currently be a handheld self-imaging mode, the process shown in FIG. 10 ends. On the other hand, in a case of determining the mode not to currently be a handheld self-imaging mode, a process which switches to a handheld self-imaging mode is executed (step S115), and the process ends.

Here, when switching between setting of a normal imaging mode and setting of a self-imaging mode, an image (a through image) which is displayed on the display surface 22S of the display section 22 is inverted from top to bottom (upside down).

In addition, in the setting of the handheld normal imaging mode and the handheld self-imaging mode, camera shake correction processing is executed. On the other hand, in the setting of the stationary normal imaging mode and the stationary self-imaging mode, camera shake correction processing is not performed or setting is carried out to weaken the effect of the camera shake correction. Due to this, there is an advantage in power saving.

In addition, apart from the process shown in FIG. 10, in the imaging apparatus 1, when the angle θ2 becomes a predetermined size by the display section 22 rotating centering on the second axis J2, a process where a divided display is switched to a full screen display may be carried out on the display surface 22S.

Here, each of the processes described above may all be automatically executed by the control section 56 and a part or all of the processes may be executed by a manual operation by the user. In this case, the imaging apparatus 1 may or may not recognize all the operation modes. For example, there may be a state where only a part of the operation mode is recognized.

5. Operational Effects of Imaging Apparatus 1

In the imaging apparatus 1, since the second housing 20 is supported so as to be able to rotate with respect to the first housing 10 which has the imaging lens 11 centering on the first axis J1, it is possible to freely change the angle of the first housing 10 in a state where the second housing 20 is still. For this reason, for example, the user (the person doing the imaging) is able to arbitrarily and freely select the angle in the tilt direction of the first housing 10 while gripping the second housing 20 without changing grip, and to carry out imaging in a comfortable posture.

In addition, it is possible to correspond with regard to the pan direction by changing the orientation of the body of the user themselves or changing the orientation of the imaging apparatus 1 by the user moving their arm. Here, since the first axis J1 is provided in a vicinity of the other end in the first housing 10, it is possible to avoid filming the second housing 20, a hand of the user holding the housing, or the like. Accordingly, according to the imaging apparatus 1, the operability further improves and it is possible for the person doing the imaging to easily perform the imaging in various styles.

In more detail, when imaging, the user is able to maintain their wrist at a natural angle along the extension direction of their forearm without bending the wrist of the hand which grips the second housing 20 at an unnatural angle. In a case of the imaging apparatus in the related art where the user grips the housing itself into which an imaging optical system is incorporated, the user bends their wrist at an unnatural angle or changes the portion to be gripped at the time of high-angle imaging or low-angle imaging. However, such a problem is solved in the imaging apparatus 1.

In addition, in the imaging apparatus 1, since the display section 22 is provided in the second housing 20 which is gripped by the user, it is possible to maintain a positional relationship between the display section 22 and the viewpoint of the user even when imaging is performed at various angles. Thus, it is possible to maintain a state where it is easy to view a through image and the convenience is excellent. Furthermore, also when performing switching from a normal imaging mode to a self-imaging mode, it is possible to quickly perform the switching between both modes since it is sufficient if only the first housing 10 is rotated without changing grip on the second housing 20.

Furthermore, in the imaging apparatus 1, it is possible to easily perform stationary imaging at a free angle since it is possible to arbitrarily set the angle θ1 between the first housing 10 and the second housing 20.

Furthermore, in the imaging apparatus 1, it is possible to perform a touch panel operation on the display surface 22S of the display section 22 and a mechanical key operation in the operation section 26 of the main body section 21 at the same time as necessary while gripping the main body section 21 of the second housing 20 with one hand.

6. Modified Example of Imaging Apparatus 1

In the present embodiment, description was given of a case of use in a state where the first housing 10 and the second housing 20 are linked in the linking section 30; however, the present technique is not limited thereto. That is, there may be a configuration which corresponds to use in a state where the first housing 10 and the second housing 20 are separated from each other. In this case, a sending and receiving function may be provided in both the first housing 10 and the second housing 20 and it may be possible to exchange signals or carry out a remote operation between the first housing 10 and the second housing 20. In this case, since it is possible to install only the first housing 10 in an arbitrary place (for example, a front portion of a vehicle) and operate the second housing 20 in a hand, the degree of freedom in selecting an imaging scene increases, such as being able to comparatively easily obtain an image which is difficult to image in the related art.

Second Embodiment

1. Configuration of Imaging Apparatus 2

Figure 11A:
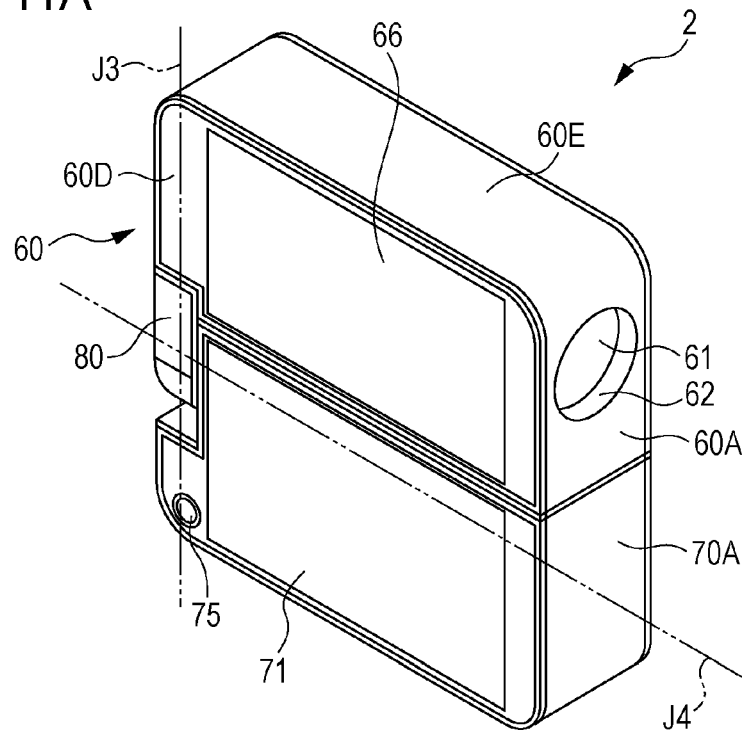
FIG. 11A is a perspective diagram which represents the external appearance of the imaging apparatus according to a second embodiment in a stored state.
Figure 11B:
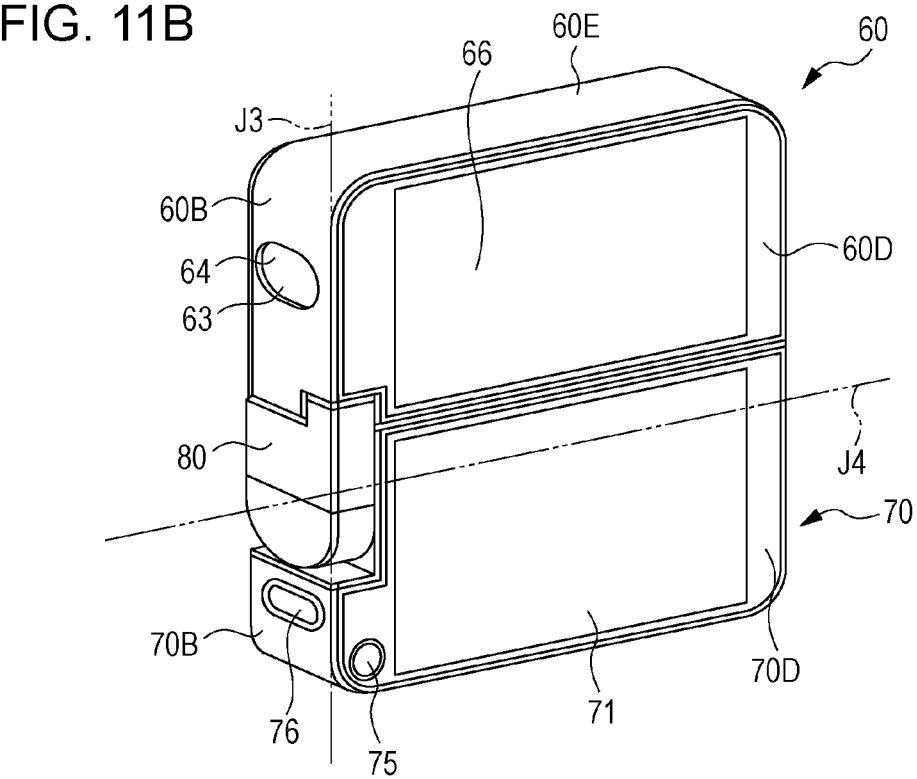
FIG. 11B is another perspective diagram which represents the external appearance of the imaging apparatus according to the second embodiment in a stored state.

FIG. 11A and FIG. 11B are perspective diagrams which represent an overall configuration of an imaging apparatus 2 as a second embodiment of the present disclosure in a stored state. FIG. 11A and FIG. 11B represent the external appearance viewed from different directions to each other. That is, FIG. 11A is the external appearance which is viewed from a direction where the front surface is visible and FIG. 11B is the external appearance which is viewed from a direction where the rear surface is visible.

Figure 12A:
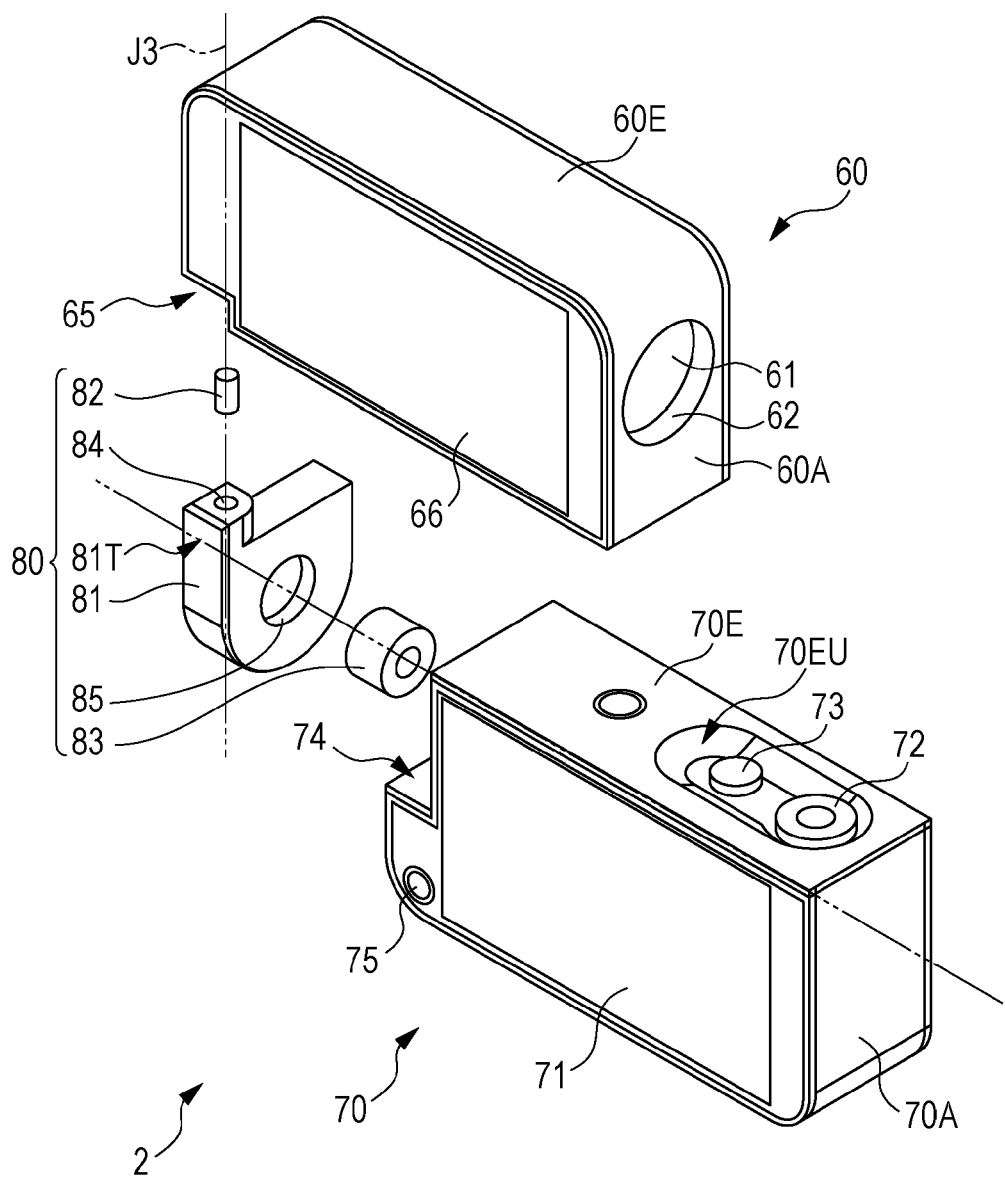
FIG. 12A is an exploded perspective diagram of the imaging apparatus according to the second embodiment.
Figure 12B:
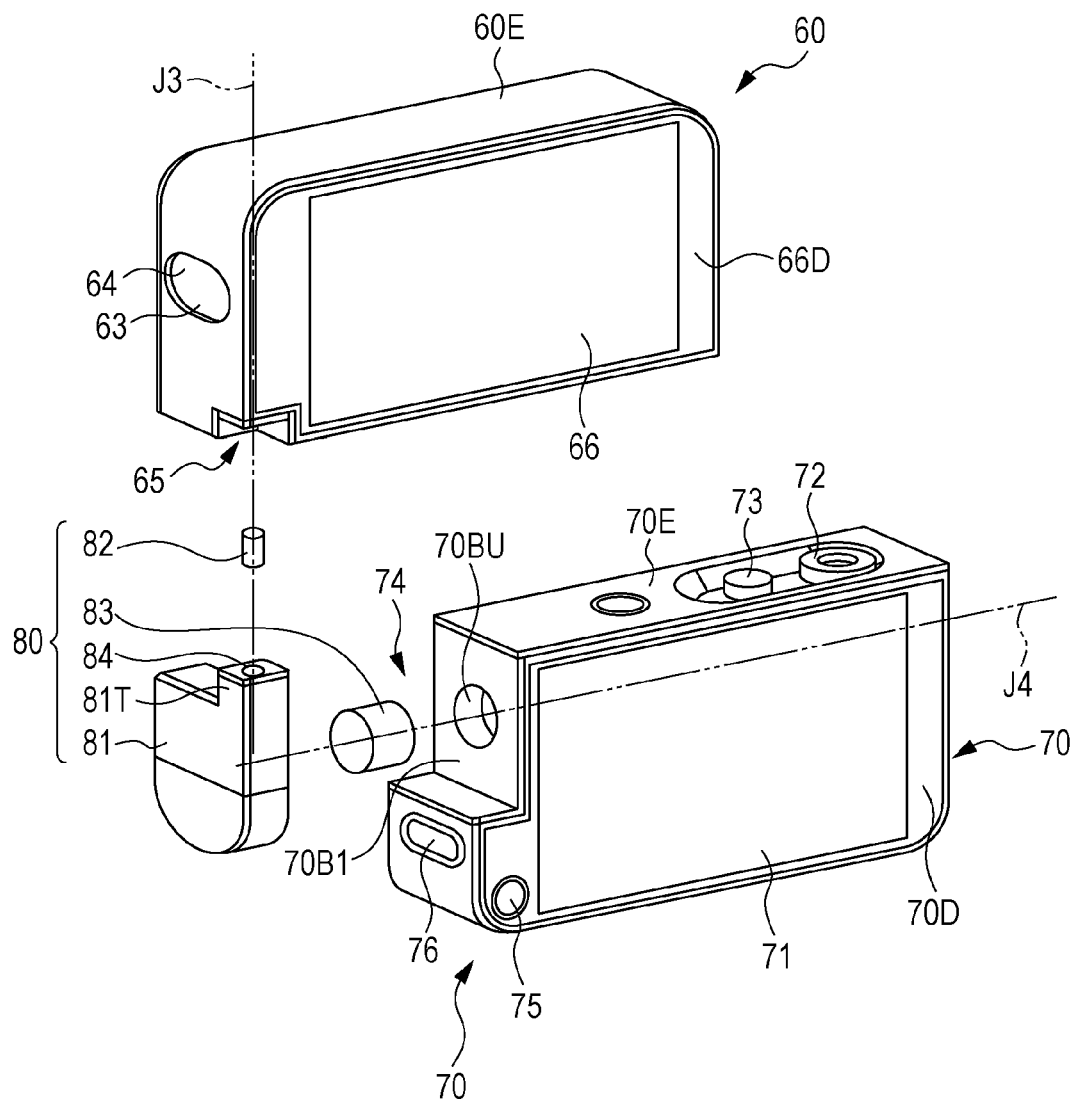
FIG. 12B is another exploded perspective diagram of the imaging apparatus according to the second embodiment.
Figure 13A:
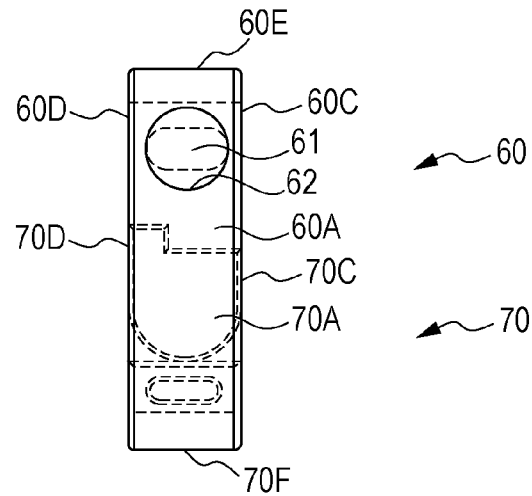
FIG. 13A is a front surface diagram which represents the external appearance of the imaging apparatus according to the second embodiment in a stored state.
Figure 13B:
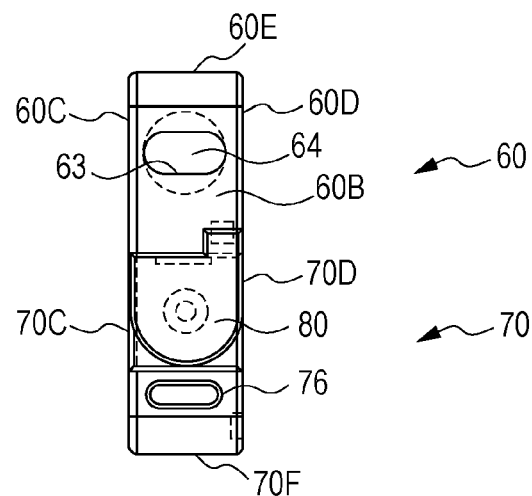
FIG. 13B is a rear surface diagram which represents the external appearance of the imaging apparatus according to the second embodiment in a stored state.
Figure 13C:
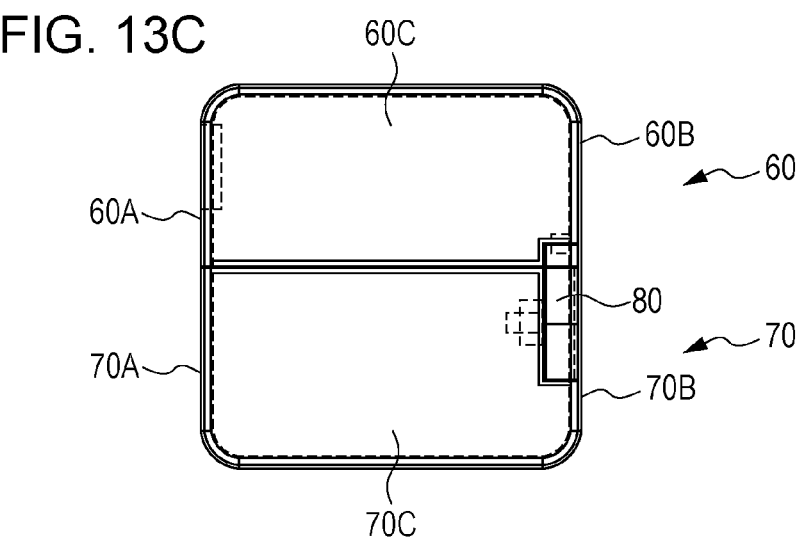
FIG. 13C is a right side surface diagram which represents the external appearance of the imaging apparatus according to the second embodiment in a stored state.
Figure 13D:
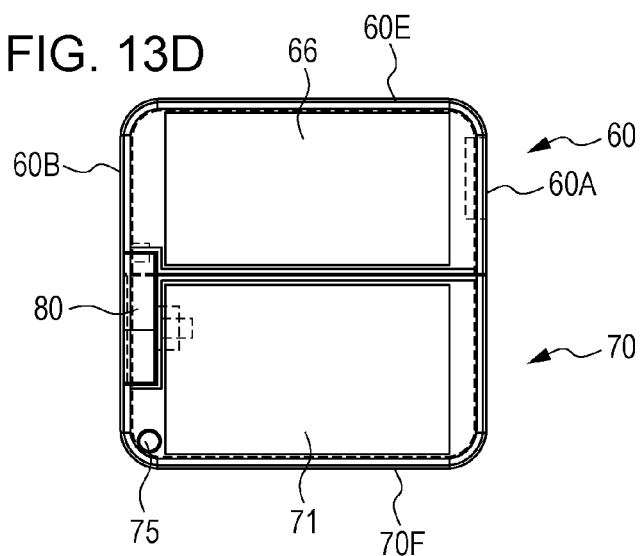
FIG. 13D is a left side surface diagram which represents the external appearance of the imaging apparatus according to the second embodiment in a stored state.
Figure 13E:
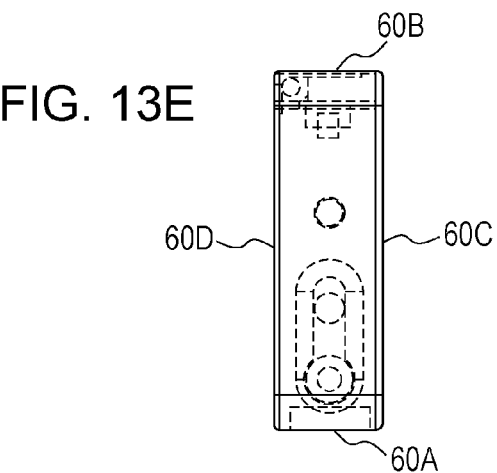
FIG. 13E is an upper surface diagram which represents the external appearance of the imaging apparatus according to the second embodiment in a stored state.
Figure 13F:
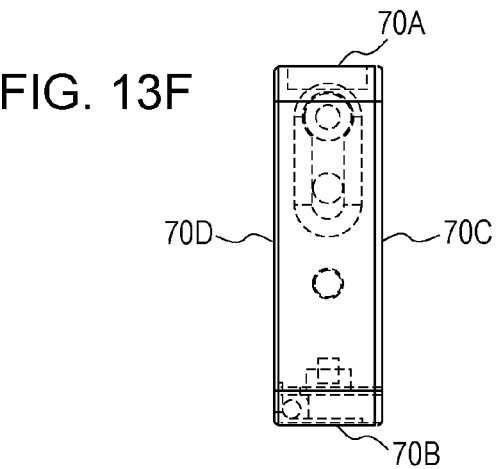
FIG. 13F is a bottom surface diagram which represents the external appearance of the imaging apparatus according to the second embodiment in a stored state.
Figure 15A:
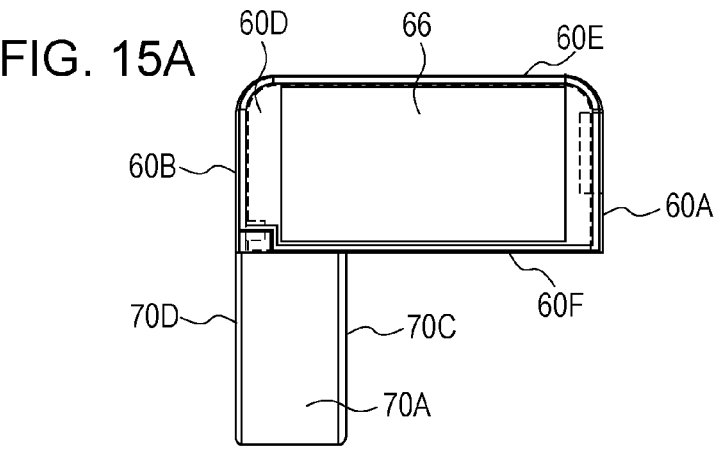
FIG. 15A is a front surface diagram which represents the external appearance of the imaging apparatus according to the second embodiment in a first use state.
Figure 15B:
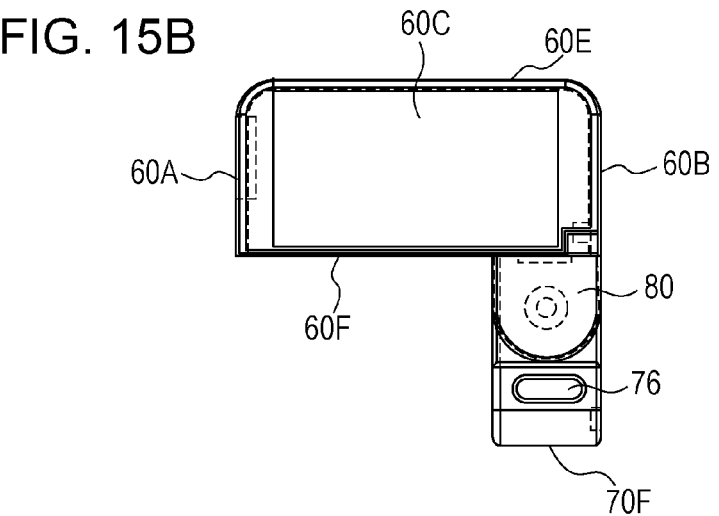
FIG. 15B is a rear surface diagram which represents the external appearance of the imaging apparatus according to the second embodiment in a first use state.
Figure 15C:
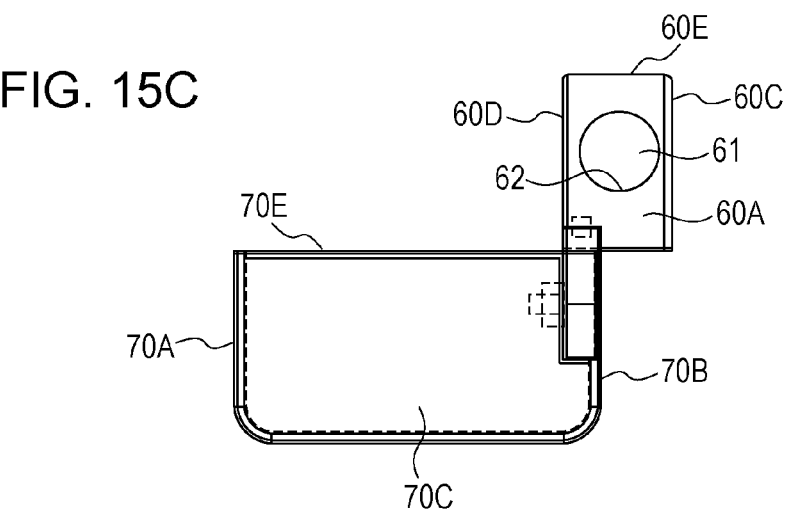
FIG. 15C is a right side surface diagram which represents the external appearance of the imaging apparatus according to the second embodiment in a first use state.
Figure 15D:
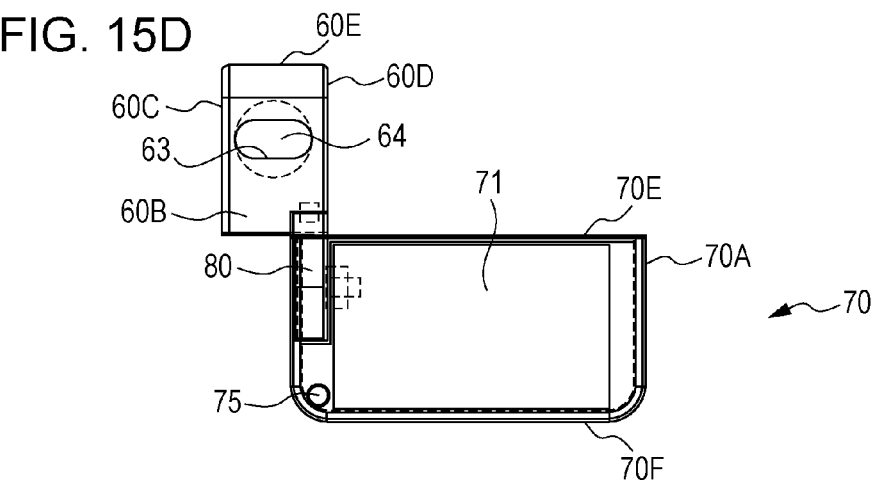
FIG. 15D is a left side surface diagram which represents the external appearance of the imaging apparatus according to the second embodiment in a first use state.
Figure 15E:
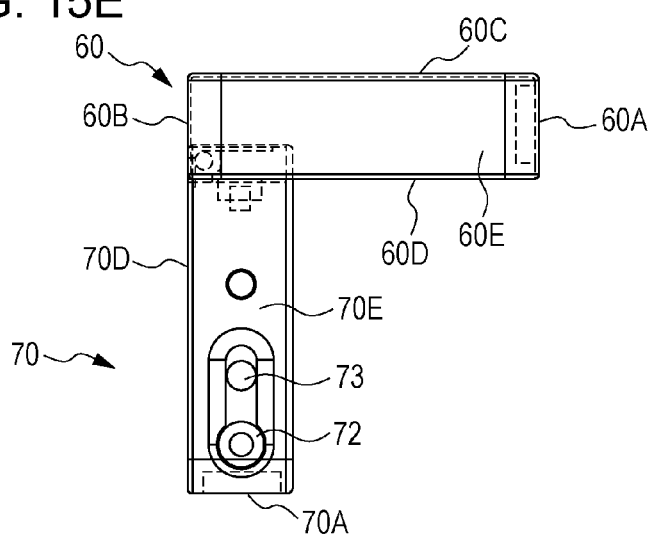
FIG. 15E is an upper surface diagram which represents the external appearance of the imaging apparatus according to the second embodiment in a first use state.
Figure 15F:
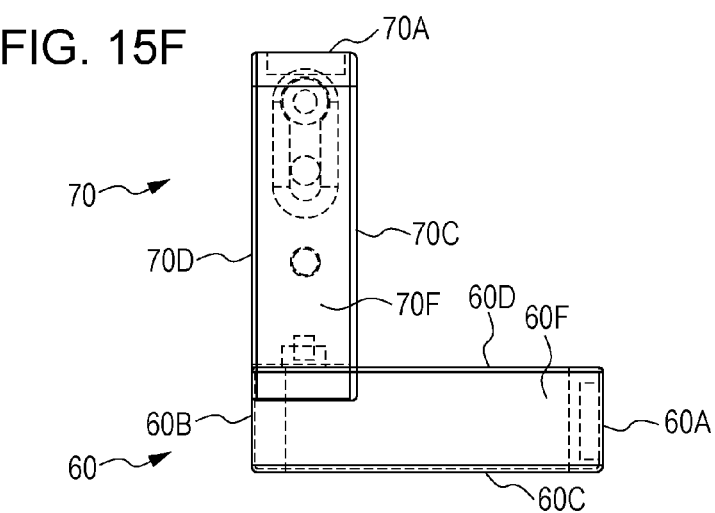
FIG. 15F is a bottom surface diagram which represents the external appearance of the imaging apparatus according to the second embodiment in a first use state.

FIG. 12A and FIG. 12B are exploded perspective diagrams of the imaging apparatus 2 which respectively correspond to FIG. 11A and FIG. 11B.

Each of FIGS. 13A to 13F is the front surface diagram, the rear surface diagram, the right side surface diagram, the left side surface diagram, the upper surface diagram, and the bottom surface diagram of the imaging apparatus 2 in a stored state. In addition, FIG. 14 are diagrams for illustrating a form of changes of the imaging apparatus 2.

In the imaging apparatus 1 in the first embodiment described above, the first housing 10 and the second housing 20 are linked by the linking section 30 so as to be able to rotate centering on only one axis (the first axis J1). With respect to this, in the imaging apparatus 2 in the present embodiment, a first housing 60 and a second housing 70 are linked by a linking section 80 so as to be able to rotate centering on each of two axes (a third axis J3 and a fourth axis J4). This point is the main point of difference between the imaging apparatus 1 and the imaging apparatus 2. In the description below, the same reference numerals are used for substantially the same constituent components in the imaging apparatus 1 and the imaging apparatus 2 and description thereof will be appropriately omitted.

The imaging apparatus 2 is provided with the first housing 60, the second housing 70, the linking section 80 which supports the first housing 60 and the second housing 70 so as to be able to rotate centering on the third axis J3. In the imaging apparatus 2, in a normal use state, the first housing 60 is arranged above the second housing 70 and the second housing 70 is arranged below the first housing 60. A state A shown in the left side in FIG. 14 represents a stored state where the first housing 60 and the second housing 70 are overlapped with each other. From the state A, the first housing 60 is able to rotate centering on the third axis J3. A state B shown in the center in FIG. 14 represents one form in a use state where the first housing 10 is rotated by substantially 90° from the state A centering on the third axis J3 as shown with an arrow R3. A state C shown in the right side in FIG. 14 represents one form in a use state where the first housing 10 is further rotated from the state B centering on the fourth axis J4 as shown with an arrow R4.

Here, the rotation centering on the third axis J3 and the rotation centering on the fourth axis J4 may both be able to rotate 360°. In addition, the third axis J3 and the fourth axis J4 are orthogonal to each other.

The first housing 60 has an imaging lens 61 as an imaging optical system. External light (for example, subject light) is incident from a light incident section 62, which is provided in a vicinity of one end of the first housing 60, to the imaging lens 61. The linking section 80 is provided at the other end which is the opposite side to the one end where the light incident section 62 of the first housing 60 is provided. The external light which is incident to the light incident section 62 is light which includes a component which is orthogonal to the third axis J3. It is desirable that the optical axis of the imaging lens 61 be in a direction which is orthogonal to the third axis J3. Here, the imaging lens 61 may be a single lens, or may be formed of a plurality of lens groups. Alternatively, the imaging lens 61 may include an optical member such as an aperture or a filter. The first housing 60 may also have a predetermined imaging element (which is not shown in the diagram) on the image side of the imaging lens 61.

The first housing 60 has, for example, a substantially rectangular parallelopiped shape. In detail, the first housing 60 has six surfaces of a front surface 60A, a rear surface 60B, a right side surface 60C, a left side surface 60D, an upper surface 60E, and a bottom surface 60F. The light incident section 62 is provided on the front surface 60A. In the first housing 60, the front surface 60A, the rear surface 60B, the right side surface 60C, and the left side surface 60D are all parallel to the third axis J3; however, out of these surfaces, the surface which is positioned the furthest from the third axis J3 is the front surface 60A where the light incident section 62 is provided.

In addition, a cut-out section 65 is provided in the vicinity of the intersection of the rear surface 60B, the left side surface 60D, and the bottom surface 60F of the first housing 60. A concave section (which is not shown in the diagram), which is hollowed out in a columnar shape along the third axis J3, is provided in the cut-out section 65. In addition, a display section 64 is provided in the left side surface 60D.

The first housing 60 has a light emitting section 63 in the rear surface 60B which is the opposite side to the light incident section 62 and also has a projection lens 64 as a projection optical system which guides light to the light emitting section 63. Light (image light) which includes a component which is orthogonal to the third axis J3 is emitted from the light emitting section 63. The optical axis of the projection lens 64 is, for example, in a direction which is orthogonal to the third axis J3. Here, the projection lens 64 may be a single lens, or may be formed of a plurality of lens groups. Alternatively, the projection lens 64 may include an optical member such as an aperture or a filter.

The second housing 70 also has a substantially rectangular parallelopiped shape in the same manner as the first housing 60. In detail, the second housing 70 has six surfaces of a front surface 70A, a rear surface 70B, a right side surface 70C, a left side surface 70D, an upper surface 70E, and a bottom surface 70F. In a closed position, the upper surface 70E of the second housing 70 opposes the bottom surface 60F of the first housing 60. In the second housing 70, the front surface 70A, the rear surface 70B, the right side surface 60C, and the left side surface 60D are all parallel to the third axis J3; however, out of these surfaces, the surface which is positioned the furthest from the third axis J3 is the front surface 70A. An operation section 72 for performing operations of, for example, starting and stopping recording, an operation section 73 which performs zooming, and the like are provided on the upper surface 70E. The operation sections 72 and 73 are provided in the bottom section of a concave section 70EU which is formed in a part of the upper surface 70E and the heights thereof are dimensions which are equal to less than the depth of the concave section 70EU. For this reason, the operation sections 72 and 73 do not come into contact with the bottom surface 60F of the first housing 60. In addition, a cut-out section 74 is provided in the rear surface 70B as a space where the linking section 80 is attached.

A concave section 70BU, which is hollowed out in a columnar shape along the fourth axis J4, is provided in a rear surface 70B1 of the cut-out section 74. Furthermore, a display section 71 is provided in the left side surface 70D. In a stored state, since the display section 71 is provided on a surface which faces the same direction as the display section 66, for example, it is also possible to display one image on the whole of the display section 71 and the display section 66. In addition, a display process where a display section 66 and the display section 71 are coordinated in a stored state may be performed, for example, by a control section which is not shown in the diagram. On the other hand, in a rotation position where the first housing 10 is rotated from the stored state with respect to the second housing 20, a display process may be performed using only the display section 66.

In addition, in the second housing 70, an operation section 75 for performing a playback operation is provided in regions (frame regions) other than the display section 71 in the left side surface 70D. For example, by pressing the operation section 75, the imaging mode is switched to a playback mode and a menu screen for a playback operation is displayed on the display section 71. Furthermore, an operation section 76 for performing an operation for turning the power source on and off is provided on the rear surface of the second housing 70.

In the imaging apparatus 2, in a stored state shown in FIG. 11A, FIG. 11B, and the like, the front surface 60A and the rear surface 60B of the first housing 60 and the front surface 20A and the rear surface 20B of the second housing 20 are parallel to each other. In a stored state, the right side surface 60C and the left side surface 60D and the right side surface 70C and the left side surface 70D are also parallel to each other and all of these are also parallel to both the third axis J3 and the fourth axis J4. Furthermore, the upper surface 60E and the bottom surface 60F and the upper surface 70E and the bottom surface 70F are also parallel to each other and all of these are also parallel to the fourth axis J4.

The stored state refers to a state where the bottom surface 60F of the first housing 60 and the upper surface 70E of the second housing 70 come into contact so as to fully overlap each other. In a stored state, the front surface 60A and the front surface 70A, the rear surface 60B and the rear surface 70B, the right side surface 60C and the right side surface 70C, and the left side surface 60D and the left side surface 70D each configure a planar surface in common. That is, in a stored state, the overall dimensions formed by outer edges of the first housing 60 and the second housing 70 are minimized.

Next, description will be given of the linking section 80. The linking section 80 has a main body section 81 and rotation axis sections 82 and 83 which form a columnar shape. The main body section 81 has a protrusion 81T which is engaged with the cut-out section 65 which is positioned below the first housing 60 in an upper section thereof. A groove 84 which is cut out in a columnar shape is formed in the top surface of the protrusion 81T and the lower part of the rotation axis section 82 is inserted into the groove 84. In addition, a groove 85 which is cut out in a columnar shape is formed in a surface of the main body section 81 which opposes the rear surface 70B1 in the cut-out section 74.

One end portion of the rotation axis section 83 is inserted into the groove 85. Due to such a configuration, the first housing 60 is supported by the rotation axis section 82 so as to be able to rotate with respect to the main body section 81 centering on the third axis J3. In addition, the second housing 70 is supported by the rotation axis section 83 so as to be able to rotate with respect to the main body section 81 centering on the fourth axis J4.

2. Operation Mode of Imaging Apparatus 2

A plurality of operation modes are also prepared in the imaging apparatus 2. The operation modes are generally classified into an imaging mode for performing imaging and a playback mode for playing back an image.

Imaging Mode

Also in the imaging apparatus 2, the imaging modes include a normal imaging mode and a self-imaging mode as an imaging mode.

FIGS. 15A to 15F represent a state where the first housing 60 is rotated by 90° from a stored state with respect to the second housing 70 centering on the third axis J3 and are respectively the front surface diagram, the rear surface diagram, the right side surface diagram, the left side surface diagram, the upper surface diagram, and the bottom surface diagram of the imaging apparatus 2. The state corresponds to a normal imaging mode, for example, where the user images a front surface. At this time, for example, the user grips a right side end section of the second housing 70 with their right hand and operates an operating key which is displayed on the display section 71 with the thumb of their right hand. Alternatively, the user operates the operation sections 72 and 73 which are provided on the upper surface 70E with the index finger or the like of their right hand.

Figure 16:
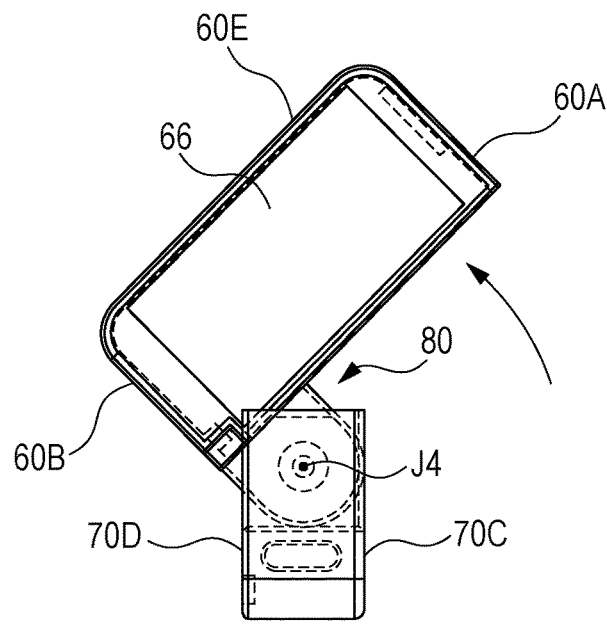
FIG. 16 is a right side surface diagram which represents one form of the imaging apparatus according to the second embodiment in a normal imaging mode.

FIG. 16 represents one form in a normal imaging mode and is a right side surface diagram which represents a state where the first housing 60 is further rotated by 45° from the state shown in FIGS. 15A to 15F centering on the fourth axis J4. The state corresponds to a case, for example, where the user images upward and to the front.

It is possible to perform imaging in a self-imaging mode in a state where the first housing 60 is rotated to the front from a stored state centering on the third axis J3, that is, to an opposite orientation to the orientation shown in FIGS. 15A to 15F.

Here, in the imaging apparatus 2, stationary imaging is possible in both the normal imaging mode and the self-imaging mode, for example, by carrying out mounting such that the bottom surface 70F of the second housing 70 comes into contact with a mounting surface such as a table surface.

Playback Mode

Figure 17A:
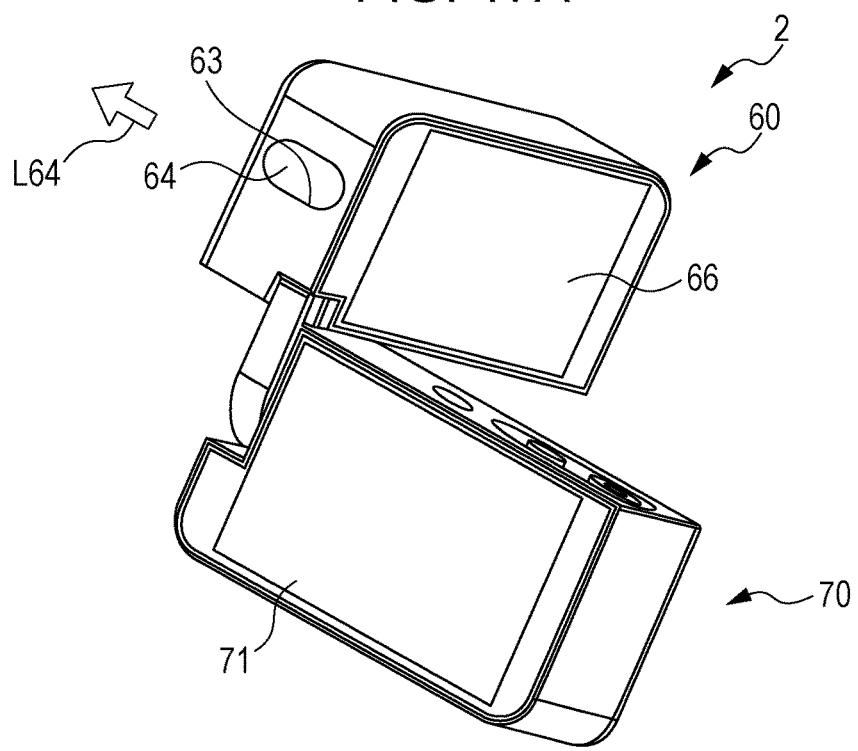
FIG. 17A is a perspective diagram which represents one form of the imaging apparatus according to the second embodiment in a projection playback mode.
Figure 17B:
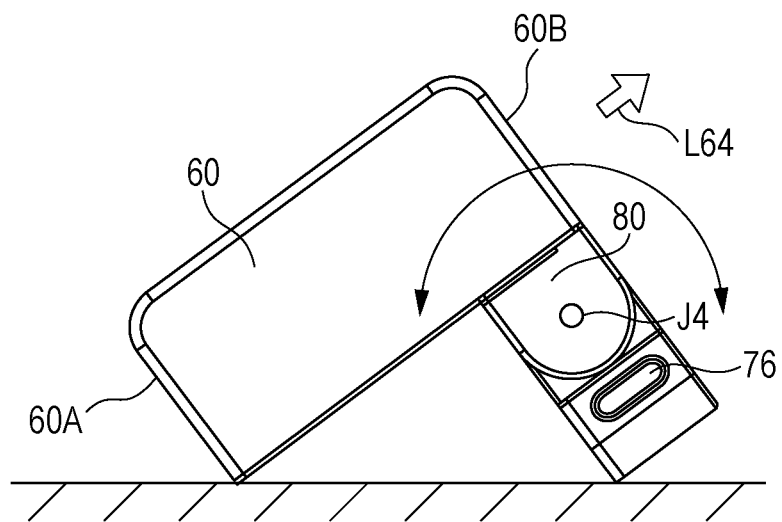
FIG. 17B is a left side surface diagram which represents one form of the imaging apparatus according to the second embodiment in a projection playback mode.
Figure 17C:
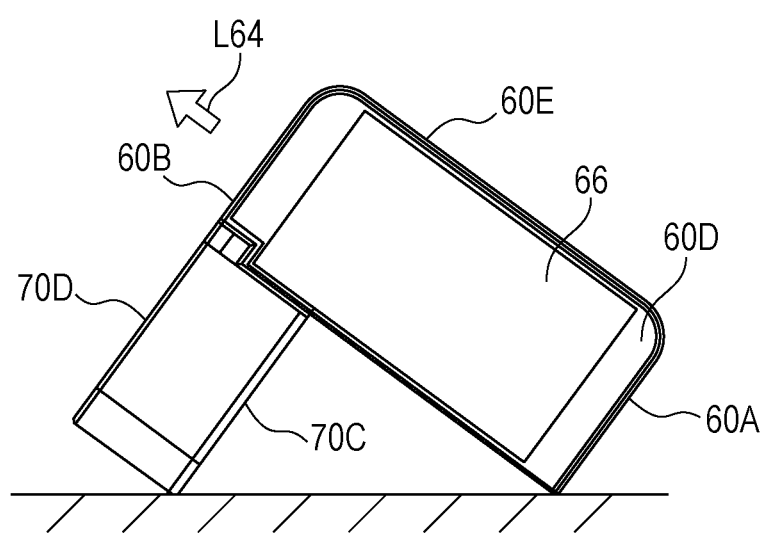
FIG. 17C is a right side surface diagram which represents one form of the imaging apparatus according to the second embodiment in a projection playback mode.

The playback modes include a projection playback mode and a screen playback mode. FIGS. 17A to 17C are respectively a perspective diagram, a left side surface diagram, and a right side surface diagram which represent a form of the imaging apparatus 2 which corresponds to the projection playback mode. Switching the imaging mode to the projection playback mode is performed, for example, by an operation of an operating key which is displayed on the display sections 66 and 71 or an operation of a mechanical key which is provided in the second housing 70. In the projection playback mode, image light L64 from the projection lens 64 is emitted from the light emitting section 63 to the outside and a playback image is projected on a screen or the like. At this time, the same playback image may also be displayed on the display sections 66 and 71 at the same time. In addition, by switching to the screen playback mode by an operation of an operating key or a mechanical key, the playback image may only be displayed on the display sections 66 and 71 without performing projection to a screen or the like.

3. Process According to Operation Mode of Imaging Apparatus 2

The imaging apparatus 2 in the present embodiment has the same circuit configuration as the imaging apparatus 1 and the control section 56 performs a predetermined process according to the operation mode.

In the imaging apparatus 2, for example, when the first housing 60 is rotated by a predetermined angle or more from a stored state centering on the third axis J3, power is automatically input to the imaging apparatus 2 and an imaging mode is set. When the first housing 60 returns to the stored state again after being rotated from the stored state, the power source is automatically turned off. Alternatively, it is possible to turn the power source on and off by operating the operation section 76. In addition, it is also possible to switch from an imaging mode to a playback mode by operating the operation section 75.

4. Operational Effects of Imaging Apparatus 2

In the imaging apparatus 2, it is possible to exhibit the same function as the imaging apparatus 1 of the first embodiment described above. That is, also in the imaging apparatus 2, since the second housing 70 is supported so as to be able to rotate with respect to the first housing 60 which has the imaging lens 61 centering on the fourth axis J4, it is possible to freely change an angle of the first housing 60 in a state where the second housing 70 is still. For this reason, for example, the user is able to arbitrarily and freely select the angle of a tilt direction of the first housing 60 or the angle of a pan direction while gripping the second housing 70 without changing grip and to carry out imaging in a comfortable posture. Here, since the third axis J3 is provided at the other end in the first housing 60, it is possible to avoid filming the second housing 70, a hand of the user holding the housing, or the like. Accordingly, according to the imaging apparatus 2, the operability further improves and it is possible for the person doing the imaging to easily perform the imaging in various styles.

Above, description was given of embodiments of the present disclosure by giving several embodiments and modification examples; however, the present disclosure is not limited to the embodiments and the like described above and various types of modifications are possible. For example, the dimensions of the first housing and the dimensions of the second housing are substantially the same in the embodiments and the like described above; however, the dimensions may be different from each other. In addition, the shapes of the first housing and the second housing are both substantially rectangular parallelepipeds; however, the present technique is not limited thereto. For example, the shapes may have a cross-sectional shape such as a semi-circular shape or a trapezoid shape.

Here, the effects described in the present specification are merely illustrative and are not limited to the description, and there may be other effects. In addition, the present technique may have the following configurations.

(1)

An imaging apparatus including a first housing which has a light incident section in a vicinity of one end and which has an imaging optical system to which light from the light incident section is incident, a second housing which has a display section and which functions as a grip section, and a linking section which supports the first housing and the second housing so as to be able to rotate centering on a first axis, in which the first axis is provided in a vicinity of the other end which is an opposite side to the one end of the first housing, and light which includes a component which is orthogonal to the first axis is incident to the light incident section.

(2)

The imaging apparatus according to (1) described above, in which a position of one end of the second housing matches a position of the one end of the first housing in a direction which is orthogonal to the first axis in a stored state, and a position of another end of the second housing matches the position of another end of the first housing.

(3)

The imaging apparatus according to (2) described above, in which one end of the first housing and one end of the second housing configure a first planar surface in common, the other end of the first housing and the other end of the second housing configure a second planar surface in common, and the first planar surface and the second planar surface are substantially in parallel with each other, and both are substantially parallel with the first axis.

(4)

The imaging apparatus according to any one of (1) to (3) described above, in which a distance from a surface which includes the one end to a surface which includes the other end in the first housing and a distance from a surface which includes the one end to a surface which includes the other end in the second housing are substantially the same, and in a stored state, a surface which includes the one end of the first housing and a surface which includes one end of the second housing are configured so as to be positioned within a surface which is substantially parallel with the first axis.

(5)

The imaging apparatus according to any one of (1) to (4) described above, in which the first housing and the second housing are able to be attached and detached to and from each other in the linking section.

(6)

The imaging apparatus according to any one of (1) to (5) described above, in which the second housing has a light emitting section in a vicinity of the other end thereof and has a projection optical system which emits light, which includes a component which is orthogonal to the first axis, from the light emitting section.

(7)

The imaging apparatus according to any one of (1) to (6) described above, in which the second housing also has a main body section, and the main body section supports the display section so as to be able to rotate centering on a second axis which is orthogonal to the first axis.

(8)

The imaging apparatus according to (7) described above, in which an operation section is provided on a surface, which opposes the display section, of the main body section in the second housing.

(9)

The imaging apparatus according to (7) or (8) described above, further including a control section which is able to change a size of a region in which the display section and the main body section overlap according to an amount of rotation in which the display section is rotated with respect to the main body section centering on the second axis, and which carries out control such that an operating menu image and an imaging image are divided and displayed on the display section in a first state where the region in which the display section and the main body section overlap is a first size, and the imaging image is displayed on the display section to be larger than in the first state in a second state where the region in which the display section and the main body section overlap is smaller than the first size.

(10)

The imaging apparatus according to (7) or (8) described above, further including a control section which carries out control such that an operating menu image and an imaging image are divided and displayed on the display section in a closed state where the entire display section overlaps the main body section, and an imaging image with larger dimensions than the imaging image in the closed state is displayed on the display section in an open state where the display section is rotated with respect to the main body section centering on the second axis.

(11)

The imaging apparatus according to any one of (1) to (10) described above, in which the first housing also has an imaging element.

(12)

The imaging apparatus according to any one of (1) to (5) described above, in which the first housing has a light emitting section in a vicinity of the other end thereof and has a projection optical system which guides light to the light emitting section.

(13)

The imaging apparatus according to any one of (1) to (5) described above, in which the first housing is arranged above the second housing and the second housing is arranged below the first housing.

(14)

The imaging apparatus according to (13) described above, in which the linking section has a second axis which is orthogonal to the first axis, and the first housing and the second housing are able to be relatively rotated centering on the second axis in a state of being relatively rotated by 90° from a stored state centering on the first axis.

(15)

The imaging apparatus according to (13) or (14) described above, in which an operation section is provided on a surface, which opposes the first housing, in the second housing in a stored state.

(16)

The imaging apparatus according to any one of (13) to (15) described above, in which the first housing has a display section which faces the same direction as the display section of the second housing in a stored state.

(17)

The imaging apparatus according to (16) described above, further including a control section which performs a display process where a display section of the first housing and a display section of the second housing are coordinated in the stored state and which performs a display process using only the display section of the first housing in a rotation position which is rotated from the stored state.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
a first housing which has a light incident section in a vicinity of first end and which has an imaging optical system to which light from the light incident section is incident;
a second housing which has a display section and which functions as a grip section; and
a linking section which is configured to support the first housing and the second housing to rotate centering on a first axis, wherein
the linking section is between the first housing and the second housing,
the first axis is in a vicinity of second end which is an opposite side to the first end of the first housing, and
the light which includes a component which is orthogonal to the first axis is incident to the light incident section.

2. The imaging apparatus according to claim 1,
wherein a position of the first end of the second housing matches a position of the first end of the first housing in a direction which is orthogonal to the first axis in a stored state, and
a position of the second end of the second housing matches the position of the second end of the first housing.

3. The imaging apparatus according to claim 2,
wherein the first end of the first housing and the first end of the second housing configure a first planar surface in common,
the second end of the first housing and the second end of the second housing configure a second planar surface in common, and
the first planar surface is parallel to the second planar surface, and both are substantially parallel with the first axis.

4. The imaging apparatus according to claim 2,
wherein a distance from a surface which includes the first end to a surface which includes the second end in the first housing and a distance from a surface which includes the first end to a surface which includes the second end in the second housing are substantially the same, and
in a stored state, a surface which includes the first end of the first housing and a surface which includes the first end of the second housing are configured so as to be positioned within a surface which is substantially parallel with the first axis.

5. The imaging apparatus according to claim 1,
wherein the first housing and the second housing are able to be attached and detached to and from each other in the linking section.

6. The imaging apparatus according to claim 1,
wherein the second housing has a light emitting section in a vicinity of the second end thereof and has a projection optical system which is configured to emit light, which includes a component which is orthogonal to the first axis, from the light emitting section.

7. The imaging apparatus according to claim 1,
wherein the second housing also has a main body section, and
the main body section is configured to support the display section to rotate centering on a second axis which is orthogonal to the first axis.

8. The imaging apparatus according to claim 7,
wherein an operation section is on a surface, which opposes the display section, of the main body section in the second housing.

9. The imaging apparatus according to claim 7, further comprising:
a control section which is configured to change a size of a region in which the display section and the main body section overlap based on an amount of rotation in which the display section is rotated with respect to the main body section centering on the second axis, and
carry out control such that an operating menu image and an imaging image are divided and displayed on the display section in a first state where the region in which the display section and the main body section overlap is a first size, and the imaging image is displayed on the display section to be larger than in the first state in a second state where the region in which the display section and the main body section overlap is smaller than the first size.

10. The imaging apparatus according to claim 7, further comprising:
a control section which is configured to carry out control such that an operating menu image and an imaging image are divided and displayed on the display section in a closed state where the entire display section overlaps the main body section, and
an imaging image with larger dimensions than the imaging image in the closed state is displayed on the display section in an open state where the display section is rotated with respect to the main body section centering on the second axis.

11. The imaging apparatus according to claim 1,
wherein the first housing further comprises of an imaging element.

12. The imaging apparatus according to claim 1,
wherein the first housing comprises of a light emitting section in a vicinity of the second end thereof and has a projection optical system which is configured to guide light to the light emitting section.

13. The imaging apparatus according to claim 1,
wherein the first housing is arranged above the second housing and the second housing is arranged below the first housing.

14. The imaging apparatus according to claim 13,
wherein the linking section has a second axis which is orthogonal to the first axis, and
the first housing and the second housing are configured to be relatively rotated centering on the second axis in a state of being relatively rotated by 90° from a stored state centering on the first axis.

15. The imaging apparatus according to claim 13,
wherein an operation section is on a surface, which opposes the first housing, in the second housing in a stored state.

16. The imaging apparatus according to claim 13,
wherein the first housing has a display section which is configured to face the same direction as the display section of the second housing in a stored state.

17. The imaging apparatus according to claim 16, further comprising:
a control section configured to perform a display process where a display section of the first housing and a display section of the second housing are coordinated in the stored state, wherein the display process is based on the display section of the first housing in a rotation position which is rotated from the stored state.

18. The imaging apparatus according to claim 1,
wherein the grip section is gripped by a user as the user images an image.

19. The imaging apparatus according to claim 7,
wherein an operation section is on the main body section.

* * * * *